(12) United States Patent
Bourbeau et al.

(10) Patent No.: US 8,746,497 B2
(45) Date of Patent: Jun. 10, 2014

(54) COOKING VESSEL AND UTENSIL

(75) Inventors: Nicolas Bourbeau, Quebec (CA); Thao Nguyen, Quebec (CA)

(73) Assignee: Atlantic Promotions Inc., Longueuil (Quebec) (CA)

( * ) Notice: Subject to any disclaimer, the term of this patent is extended or adjusted under 35 U.S.C. 154(b) by 0 days.

(21) Appl. No.: 13/208,119

(22) Filed: Aug. 11, 2011

(65) Prior Publication Data
US 2013/0037553 A1    Feb. 14, 2013

(51) Int. Cl.
| | |
|---|---|
| A47J 27/00 | (2006.01) |
| A47J 36/00 | (2006.01) |
| A47J 37/01 | (2006.01) |
| A47G 19/02 | (2006.01) |
| B65D 1/40 | (2006.01) |
| B65D 3/28 | (2006.01) |
| B65D 25/10 | (2006.01) |
| B65D 53/00 | (2006.01) |
| B65D 81/24 | (2006.01) |
| B65D 23/12 | (2006.01) |
| H05B 6/80 | (2006.01) |
| A47G 21/14 | (2006.01) |
| A47B 96/06 | (2006.01) |
| E04G 3/00 | (2006.01) |
| F16B 1/00 | (2006.01) |
| G09F 7/18 | (2006.01) |
| B65D 25/08 | (2006.01) |

(52) U.S. Cl.
USPC ............. 220/756; 220/573.1; 220/574.1; 220/735; 220/736; 215/390; 215/391; 219/732; 248/37.6; 248/229.1; 206/220

(58) Field of Classification Search
USPC ............. 220/756, 735, 736, 573.1, 574.1; 215/390, 391; 219/732; 248/37.6, 248/229.1; 206/220
See application file for complete search history.

(56) References Cited

U.S. PATENT DOCUMENTS

| | | | |
|---|---|---|---|
| 1,580,582 A | | 4/1926 | Carman |
| 2,034,940 A | * | 3/1936 | Butler ........................ 220/735 |

(Continued)

FOREIGN PATENT DOCUMENTS

| | | |
|---|---|---|
| CA | 2232284 A1 | 9/1999 |
| EP | 1 683 455 A1 | 7/2006 |

(Continued)

OTHER PUBLICATIONS

Extended European Search Report issued in European Patent Application No. 11177336.2, dated Sep. 26, 2011.

*Primary Examiner* — Fenn Mathew
*Assistant Examiner* — Andrew T Kirsch
(74) *Attorney, Agent, or Firm* — McDermott Will & Emery LLP

(57) ABSTRACT

The present invention relates to a kitchen device, namely a cooking vessel to be used with a cooking utensil. The cooking vessel is adapted to hold the utensil by the stem in order to suspend the cooking implement of the utensil above the container of the cooking vessel. More particularly, the cooking vessel comprises a container having a bottom surface, and a handle extending from the container. The handle has an opening for receiving the stem of the utensil, the opening having a predetermined shape for cooperating with the stem to temporarily hold the stem so that the cooking implement of the utensil hangs above the bottom surface of the container. There is also provided a cooking assembly comprising the cooking vessel and the utensil. There is also provided a handle to be joined to a cooking vessel, as well as a utensil to be used with the cooking vessel.

20 Claims, 23 Drawing Sheets

(56) References Cited

U.S. PATENT DOCUMENTS

| | | | |
|---|---|---|---|
| 2,593,549 A | 4/1952 | Finch | |
| 4,231,128 A | 11/1980 | James | |
| 4,515,332 A | 5/1985 | Scharfy | |
| 5,105,963 A | 4/1992 | Scott | |
| 5,678,790 A | 10/1997 | Dwyer | |
| 5,715,570 A | 2/1998 | Hyun | |
| 5,730,405 A | 3/1998 | Nichols, IV | |
| 5,829,342 A * | 11/1998 | Lee | 99/348 |
| D407,600 S | 4/1999 | LoGiudice | |
| 5,924,592 A * | 7/1999 | Hieronymus | 220/574.1 |
| 6,032,822 A * | 3/2000 | Munari | 220/573.1 |
| 2006/0185177 A1 | 8/2006 | Simard | |
| 2007/0210094 A1 | 9/2007 | Kutsch et al. | |
| 2007/0289981 A1 | 12/2007 | Shaw | |
| 2009/0134055 A1 | 5/2009 | Spellman | |

FOREIGN PATENT DOCUMENTS

| | | |
|---|---|---|
| GB | 2315667 A | 11/1998 |
| JP | 2000-070162 A | 3/2000 |
| JP | 2009-011786 A | 1/2009 |
| WO | WO 97/06719 A1 | 2/1997 |
| WO | WO 2011/070601 A1 | 6/2011 |

* cited by examiner

COOKING VESSEL AND UTENSIL

FIELD OF THE INVENTION

The present invention relates to a kitchen device. More particularly, the present invention relates to a cooking vessel, to an associated utensil, to a cooking assembly, as well as to a handle for a cooking vessel.

BACKGROUND OF THE INVENTION

Known in the art is cooking vessel or baking vessel, such as a cooking pot or pan, for preparing food. Such a cooking vessel is often used with a cooking utensil, for example, to stir the content, to taste the food, or to dispense the food from the cooking vessel. Once the utensil has come into contact with the food, it typically retains some of the food, namely fluids, sauces or the like, which may drip or soil a surface on which it is laid. Thus, a plate or other recipient is usually required to catch the dripping food or avoid dirtying a work surface. The end of the utensil may be laid on plate with the stem of the utensil extending therefrom. At the very least, resting a utensil usually takes up some of the workspace around the cooking area. In some cases, a user will rest the utensil against a side of the cooking vessel to leave the working end of the utensil in the vessel. This may undesirably heat the utensil, prevent from properly covering the pot with a lid, interfere with the cooking process, etc.

Known to the Applicant are U.S. Pat. Nos. 5,924,592 (HIERONYMUS) and 5,678,790 (DWYER), as well as United States patent applications No. 2007/0289981 A1 (SHAW) and 2007/0210094 A1 (KUTSCH) which are directed to various pots or pans, wherein the handle is adapted to support a cooking utensil. However, the pots or pans do not hold the utensil, in that the utensil is not secured in a stable position, it only rests on the handle. Thus, a wrong move may easily throw the utensil out of position. Thus, according to the systems taught by DWYER, SHAW and KUTSCH, a special precaution and care must be taken during cooking to avoid displacing the utensil with respect to the handle of the cooking pot or pan. A similar product is also known to the Applicant and shown at the following website: http://www.wearever.com/WearEver/Cookware/RealEasy/Pages/RealEasy.aspx.

Moreover, the cooking pot of KUTSCH is provided with a pivoting support member located on the handle, which entails a more complex and costly manufacturing of the cooking pot, and which may also be awkward during usage. Similarly, DWYER discloses the need for a number of components additional to a convention pot or pan. Furthermore, in the case of SHAW, teeth project from the utensil to secure it to the handle. These teeth may interfere with the normal usage of the utensil.

HIERONYMUS is directed to a cooking pot assembly, adapted to rest a cooking utensil on the handle of the cooking pot and to hold the utensil in place by positioning the lid on the pot. The utensil is configured to fit under the cover. Thus, the cover is required to secure the utensil. Indeed, a skilled reader would understand that upon lifting the cover, the utensil would easily slip into the cooking pot or at the very least be unstable.

Also known to the Applicant is Japanese patent application No. JP2000070162 (A) (SUGIYAMA et al.), as well as international patent application No. WO 97/06719 A1 (MUNARI). However, the teachings of the aforementioned documents also suffer from drawbacks, as will be apparent in view of the following explanations.

SUGIYAMA teaches a cooking pan, wherein the handle is provided with an opening located near the base of the handle for the purpose of suspending a spatula above the cooking pan. When the spatula is thus held by the opening, the blade of the spatula is raised with respect to the stem, to provide sufficient space above the container of the pan, for a lid to be placed thereon. The opening being located near the base may be undesirable for a number of reasons, including weakening of the handle, a necessity to redesign the handle and attachment to the container of the pan and increased risk of burning a user when handling the suspended spatula since the holding point is very close to the heated pan and/or food. The proximity of the opening with the base may also lead to added complexity and cost at manufacture, additional cleaning requirements, diminished aesthetic appeal, etc. Moreover, the raised configuration of the spatula when it is held may cause food remaining on the blade to drip towards the handle, which may in turn soil the handle, or even a surrounding surface, cause burns, etc.

MUNARI also teaches a similar cooking pan, wherein the handle is provided with an opening located near the base of the handle, which therefore presents corresponding drawbacks, similarly to SUGIYAMA. Moreover, the opening is formed along a longitudinal axis of the handle which may involve an added complexity for the manufacture of the article, as well as for cleaning and manipulation of the mechanism.

Hence, in light of the aforementioned, there is a need for an improved system which, by virtue of its design and components, would be able to overcome some of the above-discussed prior art concerns.

SUMMARY OF THE INVENTION

The object of the present invention is to provide a device which, by virtue of its design and components, satisfies some of the above-mentioned needs and is thus an improvement over other related cooking vessels, cooking assemblies and/or related systems known in the prior art.

In accordance with the present invention, the above mentioned object is achieved, as will be easily understood, by a cooking vessel, a cooking utensil and cooking assembly such as the one briefly described herein and such as the one exemplified in the accompanying drawings.

According to an aspect of the present invention, there is provided a cooking vessel to be used with a utensil having a cooking implement and a stem extending from the cooking implement, the cooking vessel comprising: a container having a bottom surface; and an elongated handle extending outwardly from the container, the handle having a free end provided with an opening for hooking the cooking vessel, the opening being sized and shaped for receiving the stem of the utensil, the opening having a predetermined shape for cooperating with the stem to temporarily hold the stem so that the cooking implement hangs above the bottom surface of the container.

The "cooking implement" is an end of the utensil generally used for manipulating food and the "stem" is generally used by a user for maneuvering the implement.

The expression "hangs above the bottom surface" means that the utensil reaches over the edge of the container and the implement of the utensil is positioned either above the container, inside the container or partially inside the container. Preferably, the implement is substantially aligned with the area corresponding to the container, such that matter dropping from the implement will is caught by the container. It is also to be understood that the bottom surface may refer to the lower portion of the container, or depending on the type of cooking vessel or additional devices therein, the bottom surface may be elevated with respect to the lower portion, for example, in the case of a steamer pot having a second container or plate provided within the main cooking container. Preferably, the implement is suspended off a surface of the container and out of contact from the food or any other component or device placed within the container of the cooking vessel.

According to another aspect of the present invention, there is provided a cooking assembly comprising the above-mentioned cooking vessel in combination with the above-mentioned utensil, the stem of the utensil being shaped to cooperate with the predetermined shape of said opening of the elongated handle.

According to another aspect of the present invention, there is provided an elongated handle for a cooking vessel comprising: a bottom surface, to be used with a utensil having a cooking implement and a stem extending from the cooking implement, the elongated handle comprising a base having a mounting component for mounting the handle on the cooking vessel to extend outwardly therefrom; and a free end provided with an opening for hooking the cooking vessel, the opening being sized and shaped for receiving the stem of the utensil, the opening having a predetermined shape for cooperating with the stem to temporarily hold the stem so that the cooking implement hangs above the bottom surface of the container when the elongated handle is mounted on the cooking vessel.

According to yet another aspect of the present invention, there is provided a cooking vessel to be used with a utensil having a cooking implement and a stem extending from the cooking implement, the stem having a recessed portion comprising a locking edge, the cooking vessel comprising: a container having a bottom surface; and a handle extending from the container, the handle having a support surface for supporting the stem and an opening for receiving the stem of the utensil, the opening having a stopper edge that is shaped to match with said locking edge of the stem for hooking the stem against the opening to temporarily hold the utensil so that the cooking implement hangs above the bottom surface of the container.

According to another aspect of the present invention, there is provided a cooking assembly comprising the above-mentioned cooking vessel in combination with the above-mentioned utensil.

According to yet another aspect of the present invention, there is provided a handle for a cooking vessel comprising a bottom surface, to be used with a utensil having a cooking implement and a stem extending from the cooking implement, the stem having a recessed portion comprising a locking edge, the handle comprising: a base having a mounting component for mounting the handle on the cooking vessel; a support surface for supporting the stem; and an opening for receiving the stem of the utensil, the opening having a stopper edge that is shaped to match with said locking edge of the stem for hooking the stem against the opening to temporarily hold the utensil so that the cooking implement hangs above the bottom surface of the container when the handle is mounted on the cooking vessel.

According to yet another aspect of the present invention, there is provided a utensil to be used with a cooking vessel comprising a container having a bottom surface and a handle extending from the container, the handle having an opening which comprises a stopper edge, the utensil comprising: a cooking implement; and a stem extending from the cooking implement, the stem being shaped and sized to fit into the opening of the handle of the cooking vessel, the stem having a recessed portion comprising a locking edge that is shaped and positioned to match said stopper edge of the opening for positioning the stem with respect to the handle to temporarily hold the utensil at the opening so that the cooking implement hangs above the bottom surface of the container.

The objects, advantages and features of the present invention will become more apparent upon reading of the following non-restrictive description of preferred embodiments thereof, given for the purpose of exemplification only, with reference to the accompanying drawings.

DETAILED DESCRIPTION OF PREFERRED EMBODIMENTS OF THE INVENTION

Figure 1:
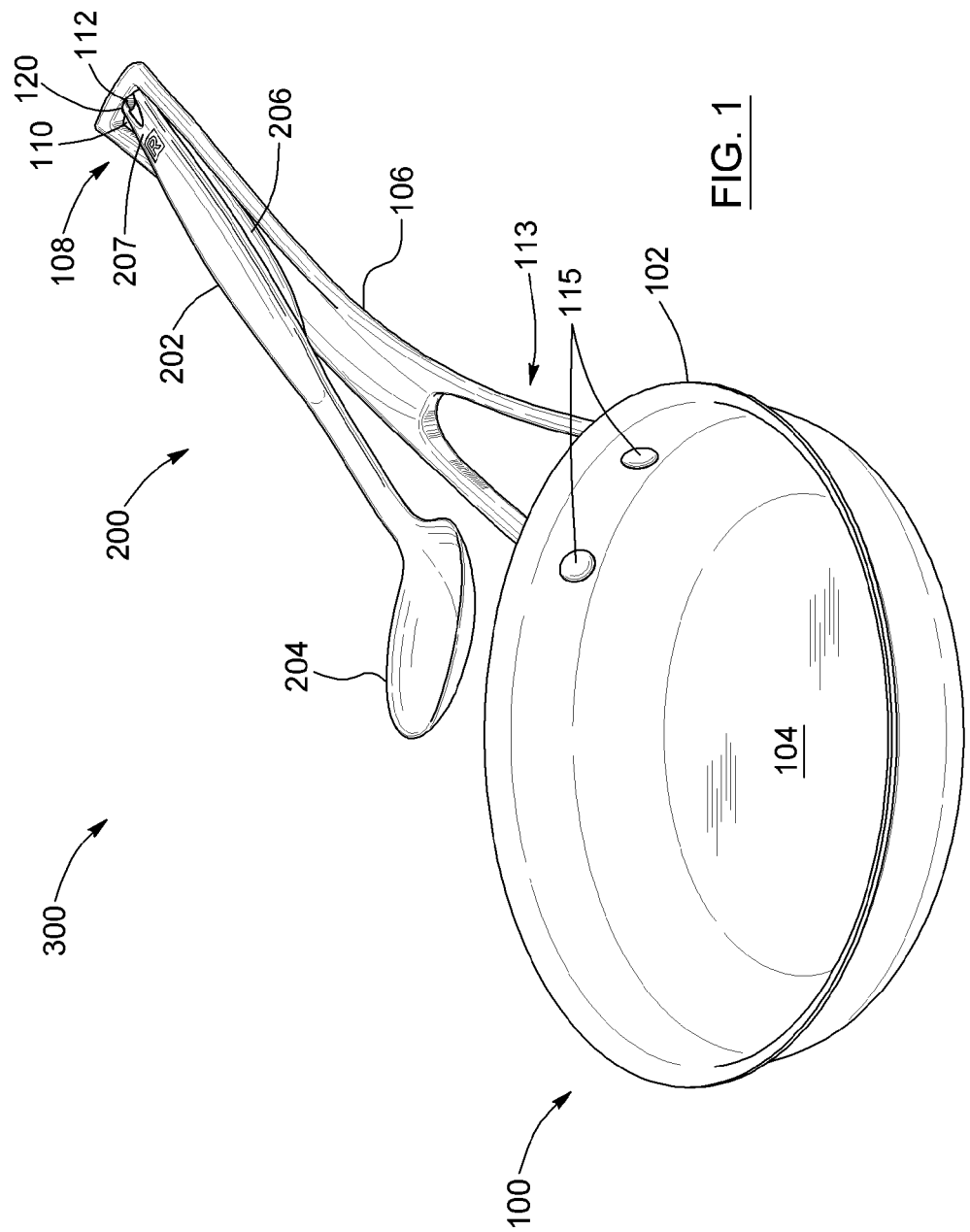
FIG. 1 is a perspective view of a cooking assembly according to a preferred embodiment of the present invention, including a cooking vessel and a utensil supported on the cooking vessel.
Figure 2:
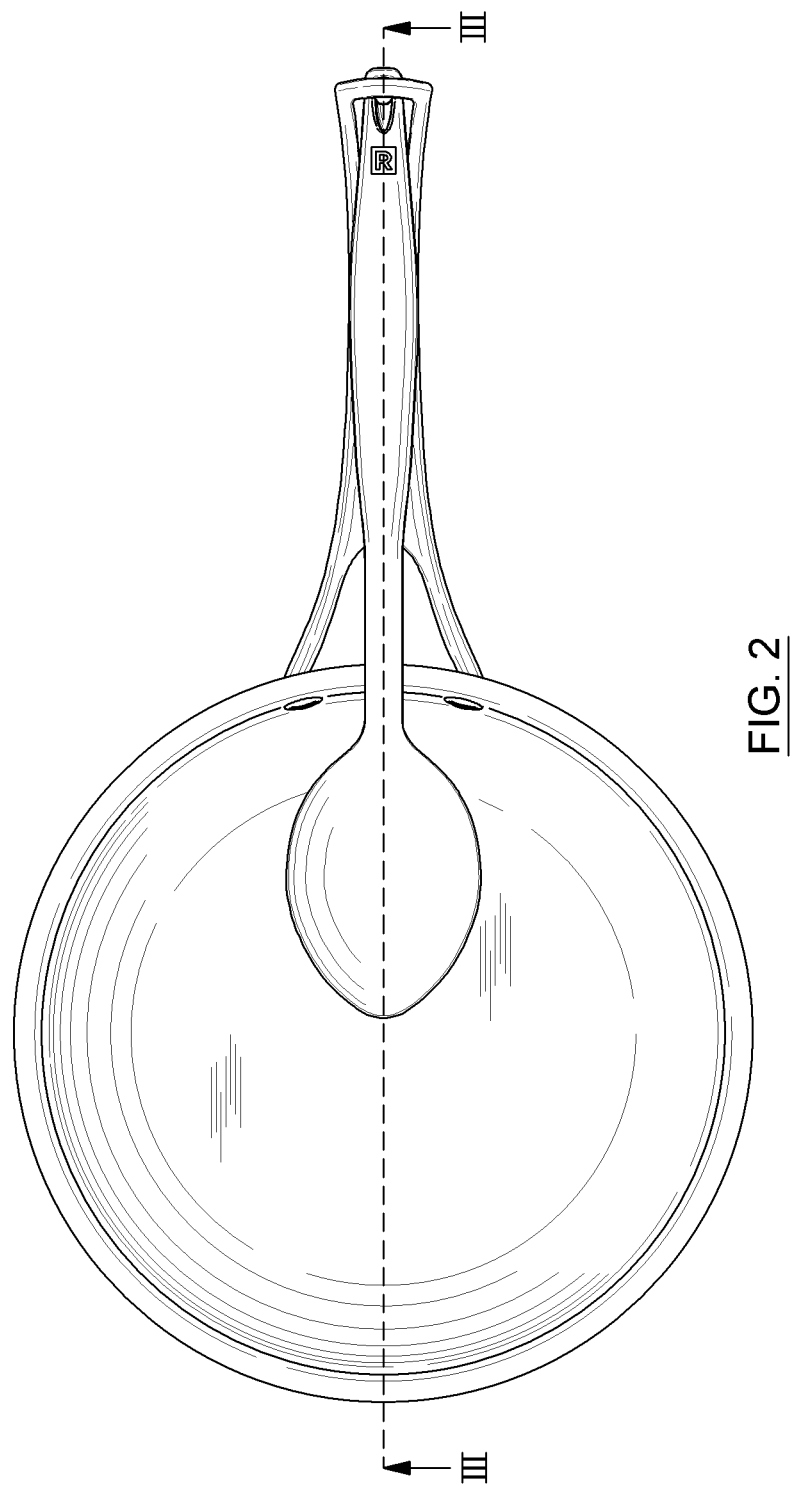
FIG. 2 is a top view of the cooking assembly shown in FIG. 1.

In the following description, the same numerical references refer to similar elements. The embodiments, geometrical configurations, materials mentioned and/or dimensions shown in the figures or described in the present description are preferred embodiments only, given for exemplification purposes only.

In the context of the present invention, the expressions "cooking vessel", "pot", "pan", and any other equivalent expression and/or compound words thereof known in the art will be used interchangeably. Furthermore, the same applies for any other mutually equivalent expressions, such as "lower peripheral portion" and "first contact surface", as well as "upper peripheral portion" and "second contact surface", for example, as also apparent to a person skilled in the art.

Moreover, although the preferred embodiment of the present invention as illustrated in the accompanying drawings comprises components such as an upper peripheral surface, a lower peripheral portion, a recess, a recessed portion, a locking edge, a stopper edge, etc., and although the preferred embodiment of the cooking vessel, the handle, the utensil, the cooking assembly and corresponding parts thereof consists of certain geometrical configurations as explained and illustrated herein, not all of these components and geometries are essential to the invention and thus should not be taken in their restrictive sense, i.e. should not be taken as to limit the scope of the present invention. It is to be understood, as also apparent to a person skilled in the art, that other suitable components and cooperations thereinbetween, as well as other suitable geometrical configurations may be used for the cooking vessel according to the present invention, as will be briefly explained herein and as can be easily inferred herefrom, by a person skilled in the art, without departing from the scope of the invention.

Broadly described, the cooking vessel according to the present invention, as exemplified in the accompanying drawings, is a cooking vessel to be used with a utensil having a cooking implement and a stem extending from the cooking implement. The cooking vessel is adapted to temporarily hold the utensil by the stem in order to suspend the cooking implement above the container of the cooking vessel. Referring to FIG. 1 to 4, there is shown a cooking vessel 100, namely a pan, with a utensil 200, namely a spoon. The cooking vessel 100 comprises a container 102 having a bottom surface 104, and an elongated handle 106 extending outwardly from the container 102. The handle 106 has a free end 108 provided with an opening 110 for hooking the cooking vessel 100. The opening 110 is sized and shaped for receiving the stem 202 of the utensil 200. The opening 110 has a predetermined shape for cooperating with the stem 202 to temporarily hold the stem 202 so that the cooking implement 204 hangs above the bottom surface 104 of the container 102. Indeed, the opening 110 which is normally used for hooking the cooking vessel during storage is shaped, sized and configured to hold the utensil 200, when using the cooking vessel.

As can be seen in the drawings, with further reference to FIG. 5 to 8, the predetermined shape of the opening 110 is characterized by an upper peripheral portion 112 and a lower peripheral portion 114. The lower peripheral portion 114 is located between the upper peripheral portion 112 and the container 102. The upper 112 and lower 114 peripheral portions of the opening 110 cooperate with the stem 202 to temporarily hold said stem 202 between the upper 112 and lower 114 peripheral portions. Indeed, as can be seen in FIG. 1, a lower portion 206 of the stem 202 of the utensil 200 rests on the lower peripheral portion 114. The stem 202 is further counterbalanced, via a downward force and/or frictional engagement, by the upper peripheral portion 112, which is in contact with an upper portion 207 of the stem to prevent the stem from slipping down along the handle 106, as well as to secure the stem 202 in position. Indeed, the lower peripheral portion 114 provides a first contact surface and the upper peripheral portion 112 provides a second contact surface, the first 114 and second 112 contact surfaces each exert a force on the stem 202, in substantially opposing directions, so as to hold the stem 202 thereinbetween, in a stable position.

As can also be seen, the elongated handle 106 extends upwardly from the container 102. The base 113 of the handle is V-shaped and attached to the container by way of fasteners 115. Moreover, the upper peripheral portion 112 is positioned with respect to the lower peripheral portion 114 so that, when the utensil 200 is temporarily held, the implement 204 of the utensil 200 is biased downwardly toward the bottom surface 104 of the cooking vessel 100. More particularly, the stem 202 is inclined downwardly toward the container 102. It is to be understood that the implement of the utensil may be oriented in any suitable direction. For example, in the embodiment shown in FIG. 3, though the implement 204 is positioned upwardly, food matter present on the implement 204 will tend to collect near the connection between the implement 204 and the stem 202 and then drop into the container 102.

Figure 3:
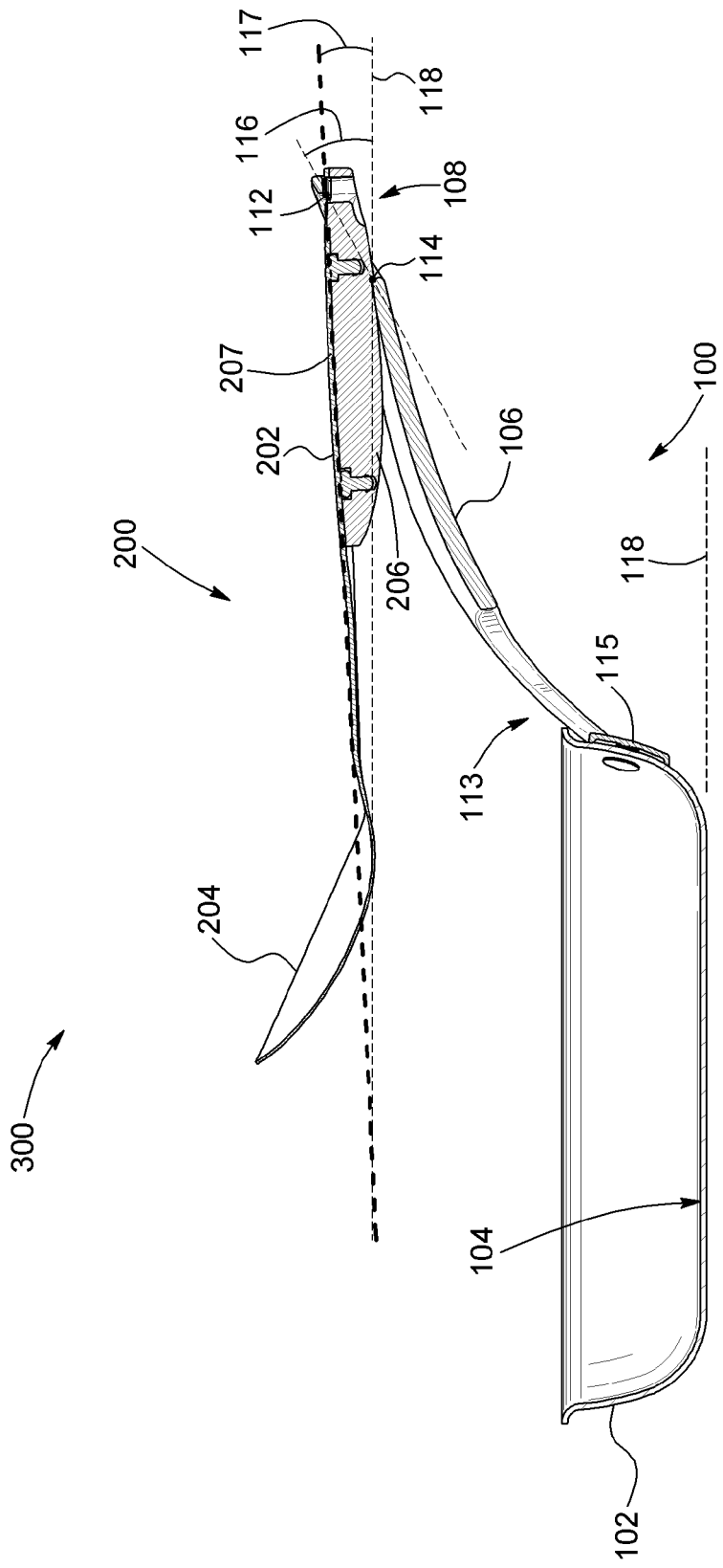
FIG. 3 is a cross-sectional side view of the cooking assembly shown in FIG. 2, taken along line III-III.

Thus, with reference to FIG. 3, the upper peripheral portion 112 and the lower peripheral portion 114 form an inclination angle 116 with the plane 118 of the bottom surface 104, of about 30 degrees. By "plane 118 of the bottom surface", it is meant any plane which is generally parallel with the bottom surface 104 of the cooking vessel when it is positioned for cooking and containing food in the container. In other words, the plane 118 refers to a substantially horizontal plane. The inclination angle 116 is preferably less than 90 degrees. Still preferably, the inclination angle 116 is between 15 and 60 degrees.

According to the embodiment shown in FIG. 3, the angle 117 which the stem 202 of the utensil forms with the plane 118, is of about 2.5 degrees. It is to be understood that the inclination 117 of the utensil resulting from the above-mentioned inclination angle 116, may vary depending on the shape and size of the stem of the utensil, since a lower portion 206 of the utensil rests on the lower peripheral portion and an upper portion 207 of the stem 202 of the utensil 200. Thus, the utensil 200 is preferably configured to cooperate with the opening and with the elongated handle 106, in order to obtain the desired inclination of the utensil 200. Preferably, the angle 117 is less than 65 degrees. Still preferably, the angle 117 is 30 degrees or less, or even 10 degrees or less, in order to impart more stability to the utensil 200 when it is held by the cooking vessel 100.

Figure 4:
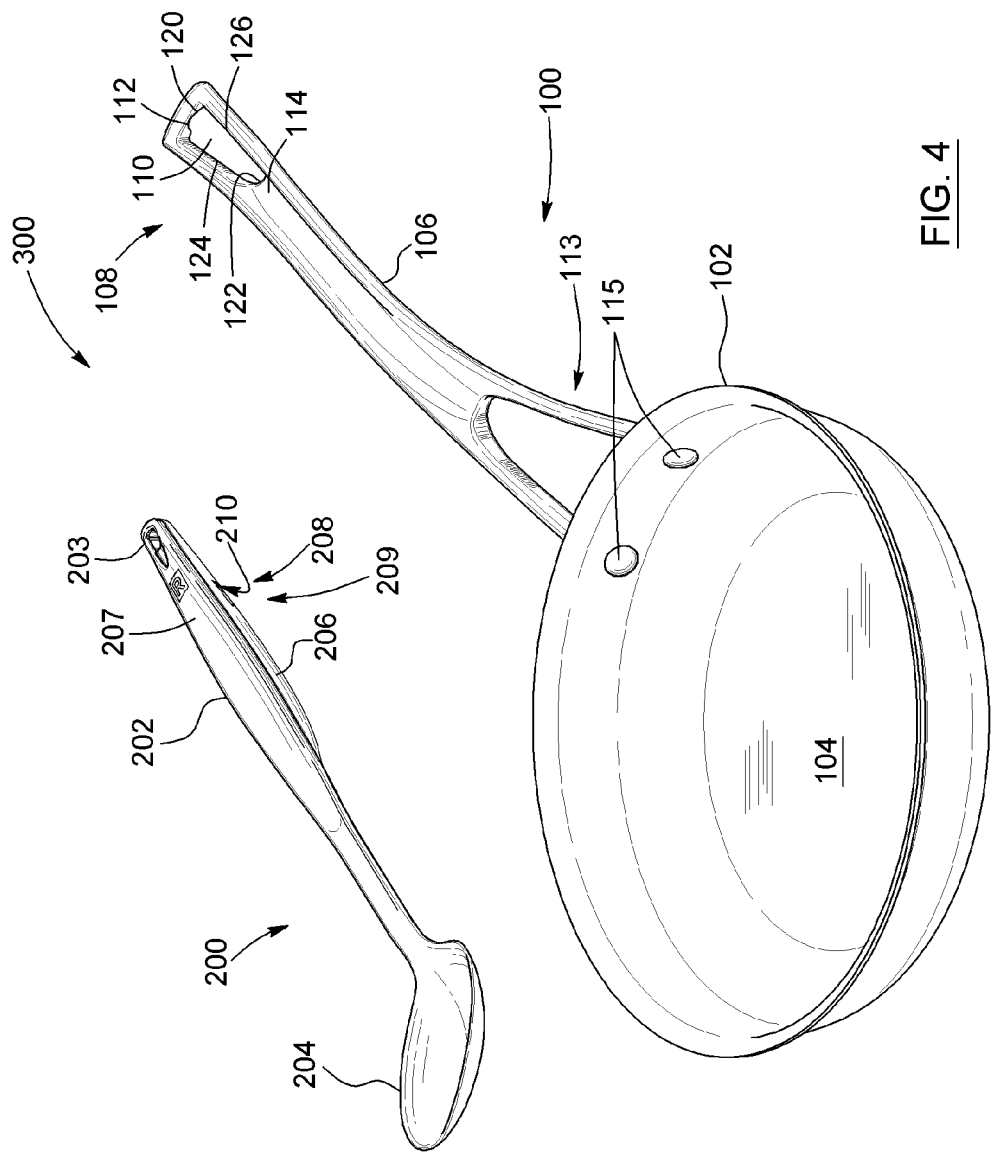
FIG. 4 is an exploded view of the cooking assembly shown in FIG. 1.
Figure 5:
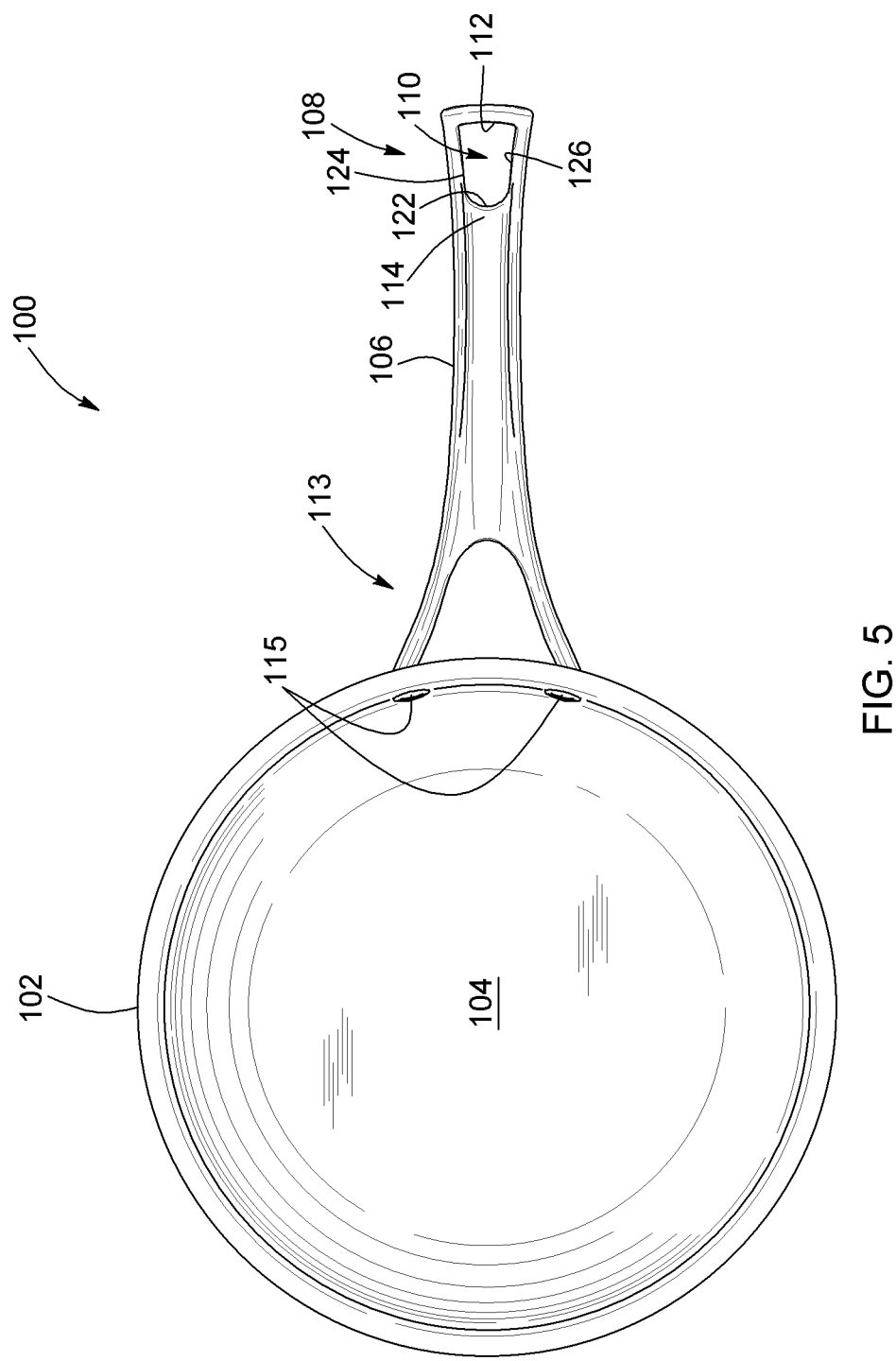
FIG. 5 is a top view of the cooking vessel shown in FIG. 1.
Figure 6:
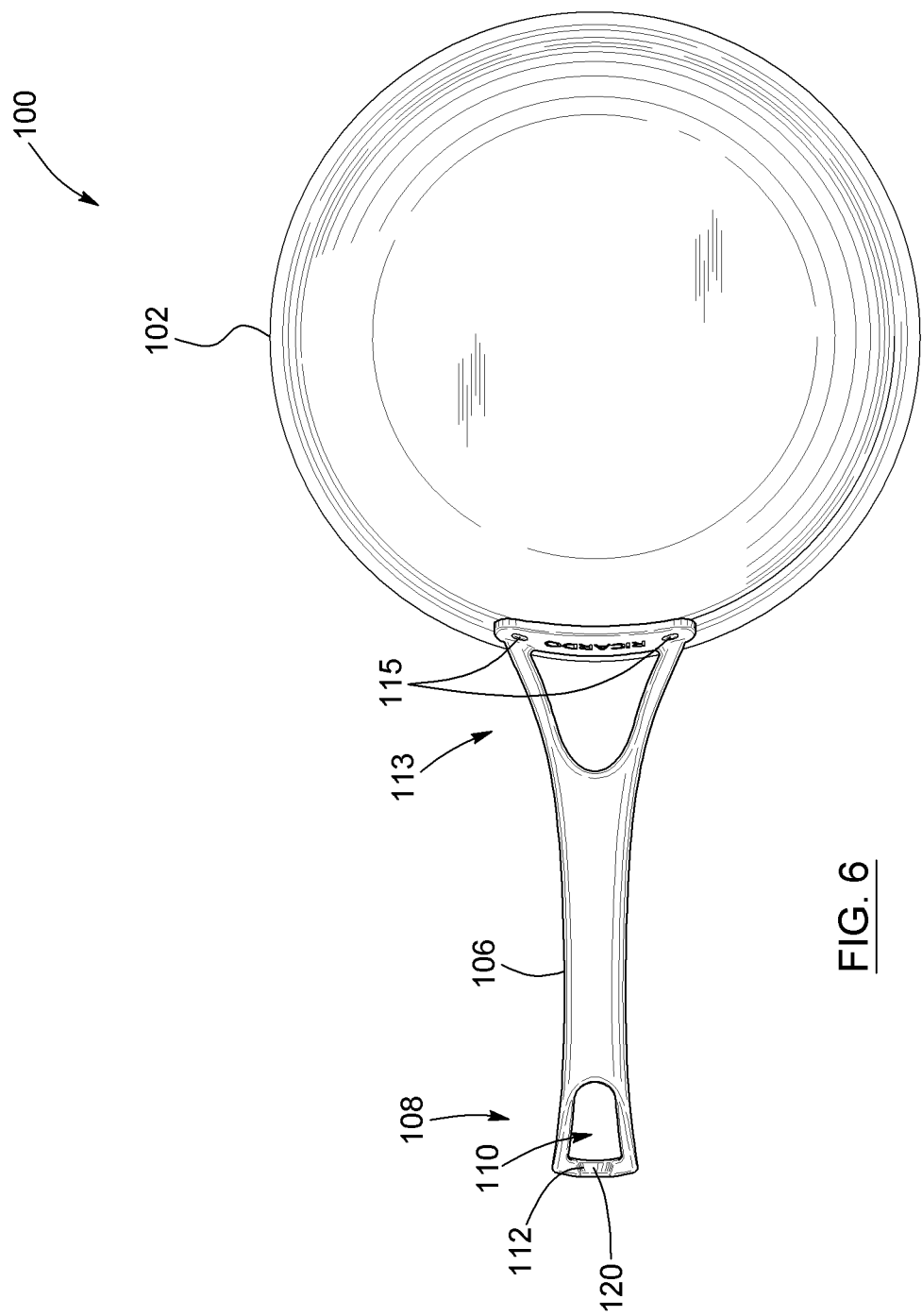
FIG. 6 is a bottom view of the cooking vessel shown in FIG. 5.
Figure 7:
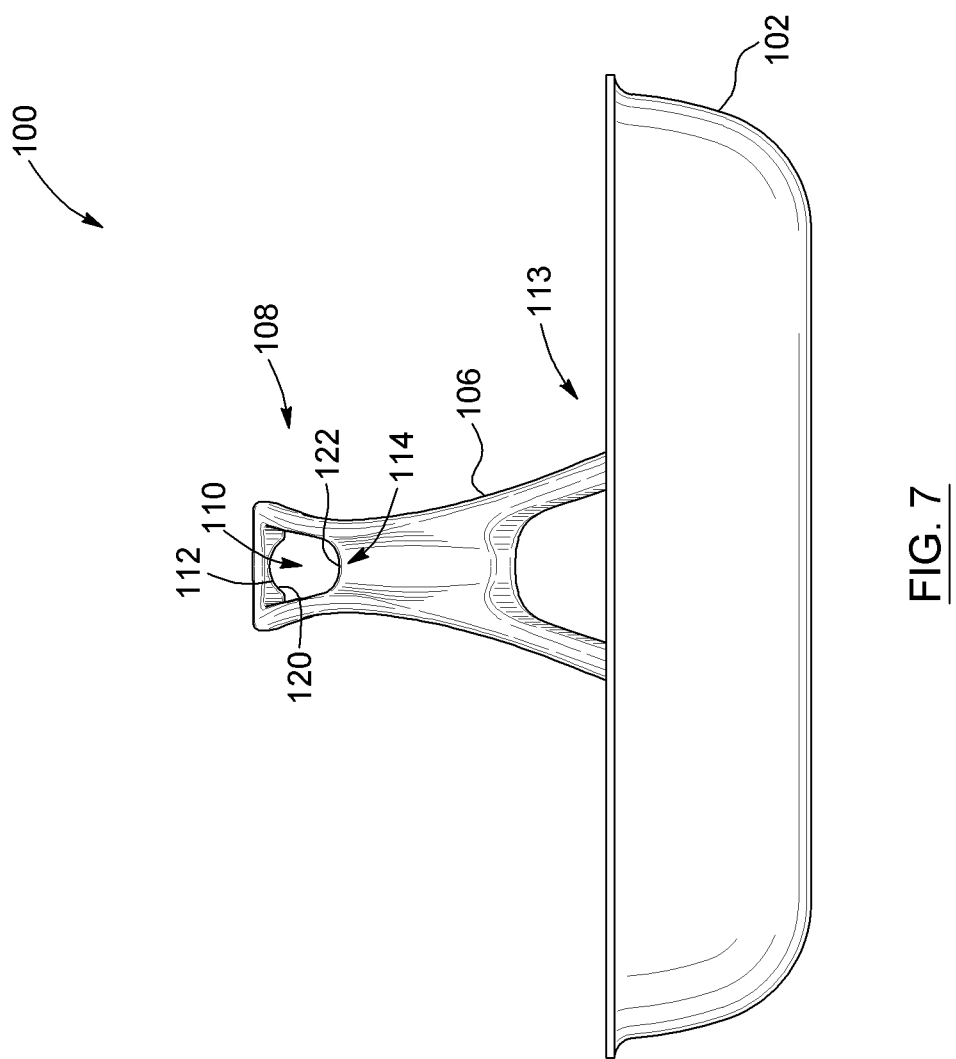
FIG. 7 is a front view of the cooking vessel shown in FIG. 5.
Figure 8:
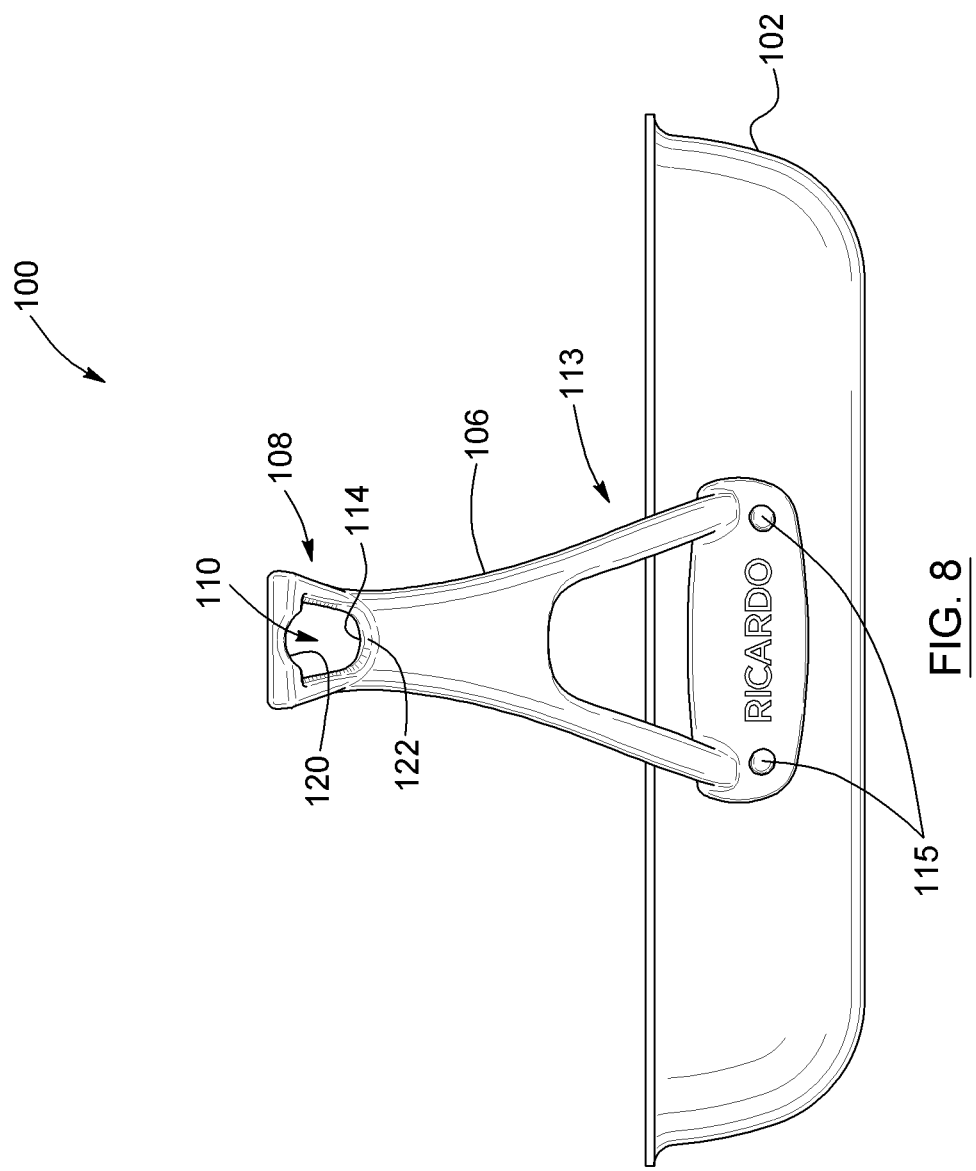
FIG. 8 is a rear view of the cooking vessel shown in FIG. 5.

With reference to FIGS. 1 and 4, the upper peripheral portion 112 comprises a recess 120 capable of cooperating with the stem 202. Namely, the recess 120 is shaped to fittingly nest therein a corresponding portion 203 of the stem 202. Indeed, as apparent in FIG. 4, the recess 120 is curved for mating with the stem 202 of the utensil 200, which is rounded at the corresponding portion 203.

According to an alternative embodiment, there is no such recess. For example, if the stem extends fittingly between side edges (corresponding to 124, 126 in FIG. 4) of the opening and/or if the stem is substantially flat in the area of contact with the upper peripheral surface, there may be no need for such a recess. Moreover, it is to be understood that a recess may be provided on the utensil, alternatively or additionally to the recess on the upper peripheral surface, in order to engage the upper peripheral surface, as can be understood by a person skilled in the art.

Referring back to FIGS. 1 and 4, the lower peripheral portion 114 extends along the elongated handle 106 of the cooking vessel 200, for supporting a corresponding contact portion 209 of the stem 202 of the utensil 200. Moreover, the lower peripheral portion 112 is curved for mating with the stem 202, having a complementarily rounded portion 209. This configuration further secures the stem 202 with respect to the handle 106.

Figure 9:
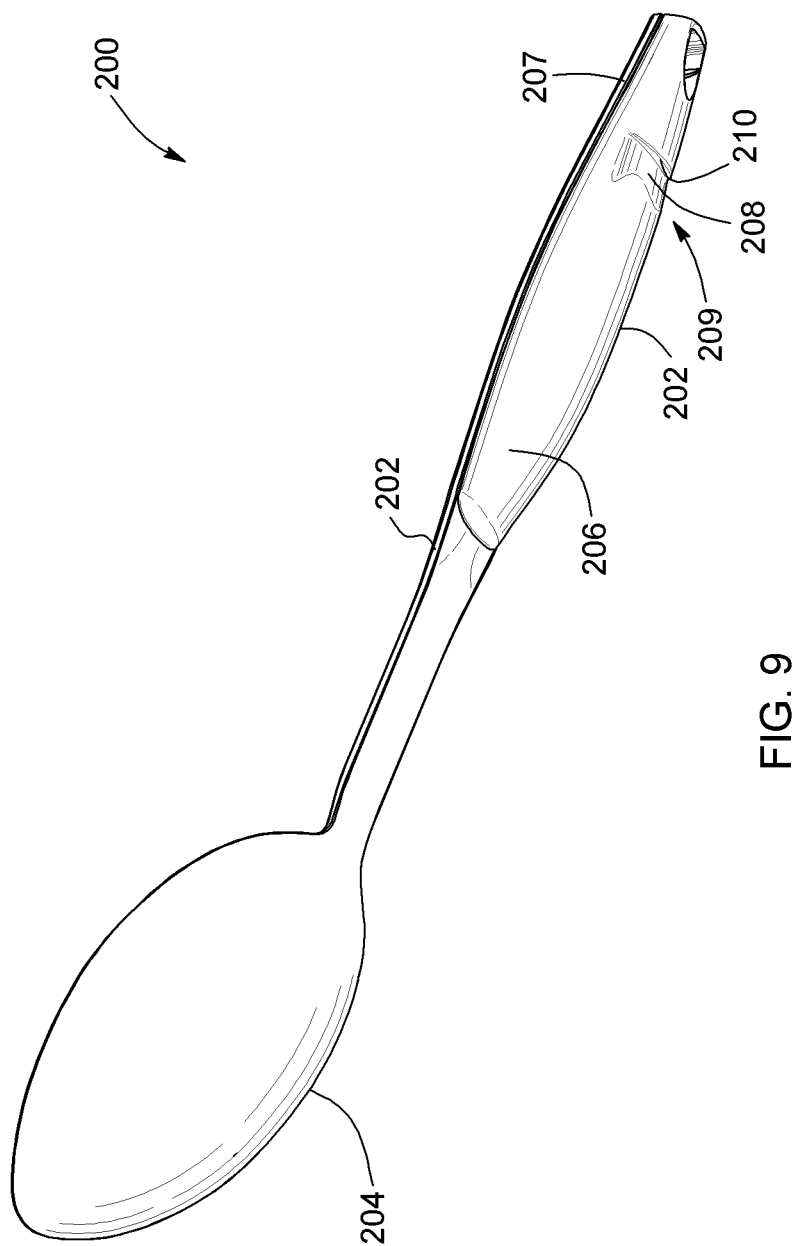
FIG. 9 is a bottom perspective view of the utensil shown in FIG. 1.
Figure 10:
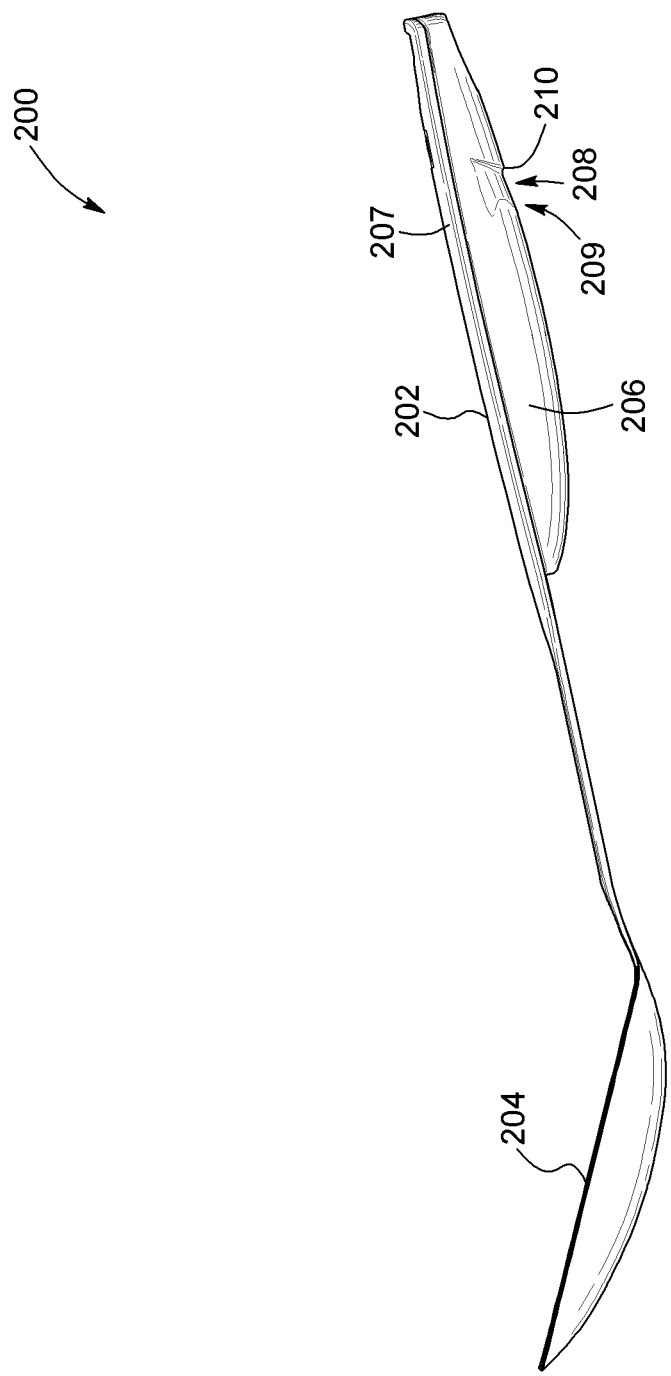
FIG. 10 is a side view of the utensil shown in FIG. 9.
Figure 11:
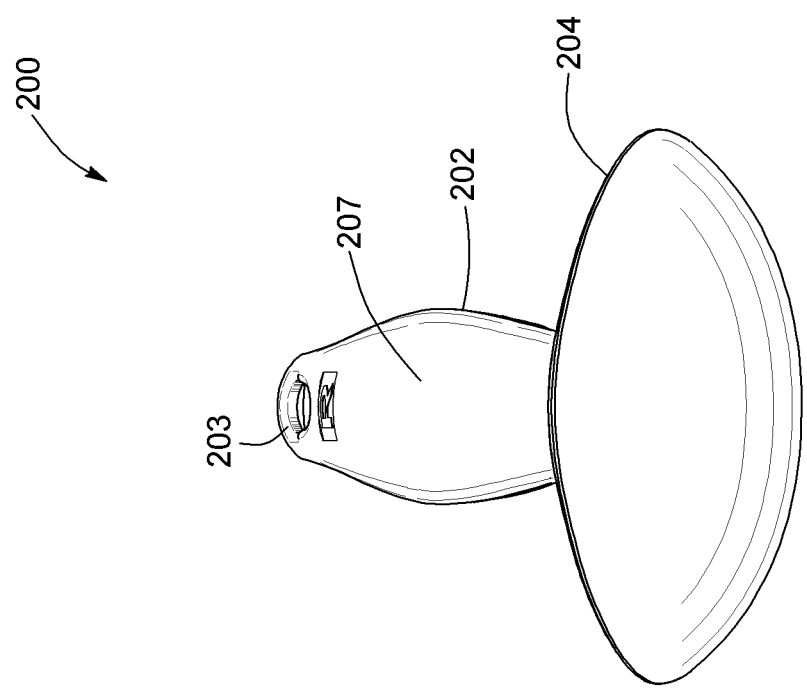
FIG. 11 is a front view of the utensil shown in FIG. 9.
Figure 12:
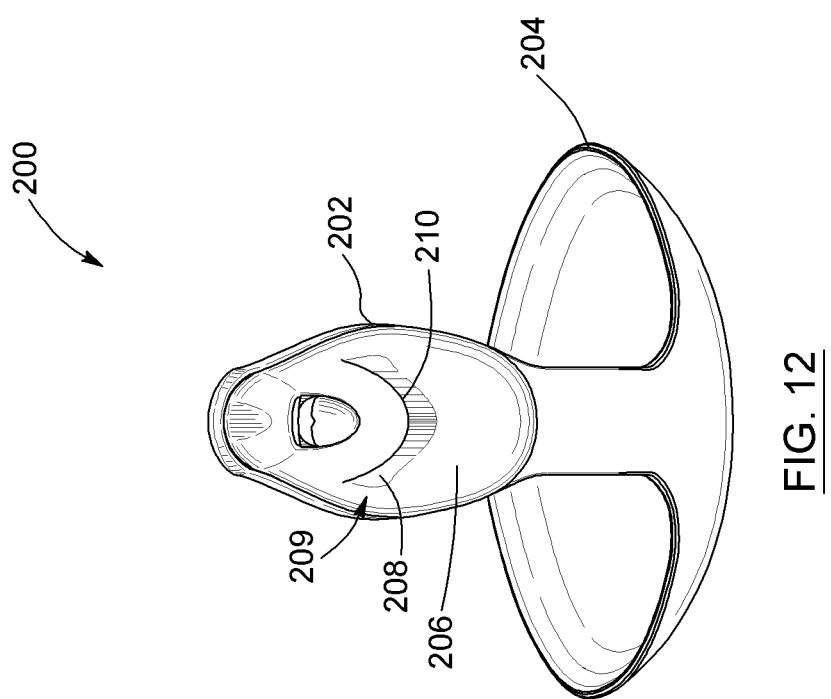
FIG. 12 is a rear view of the utensil shown in FIG. 9.
Figure 13:
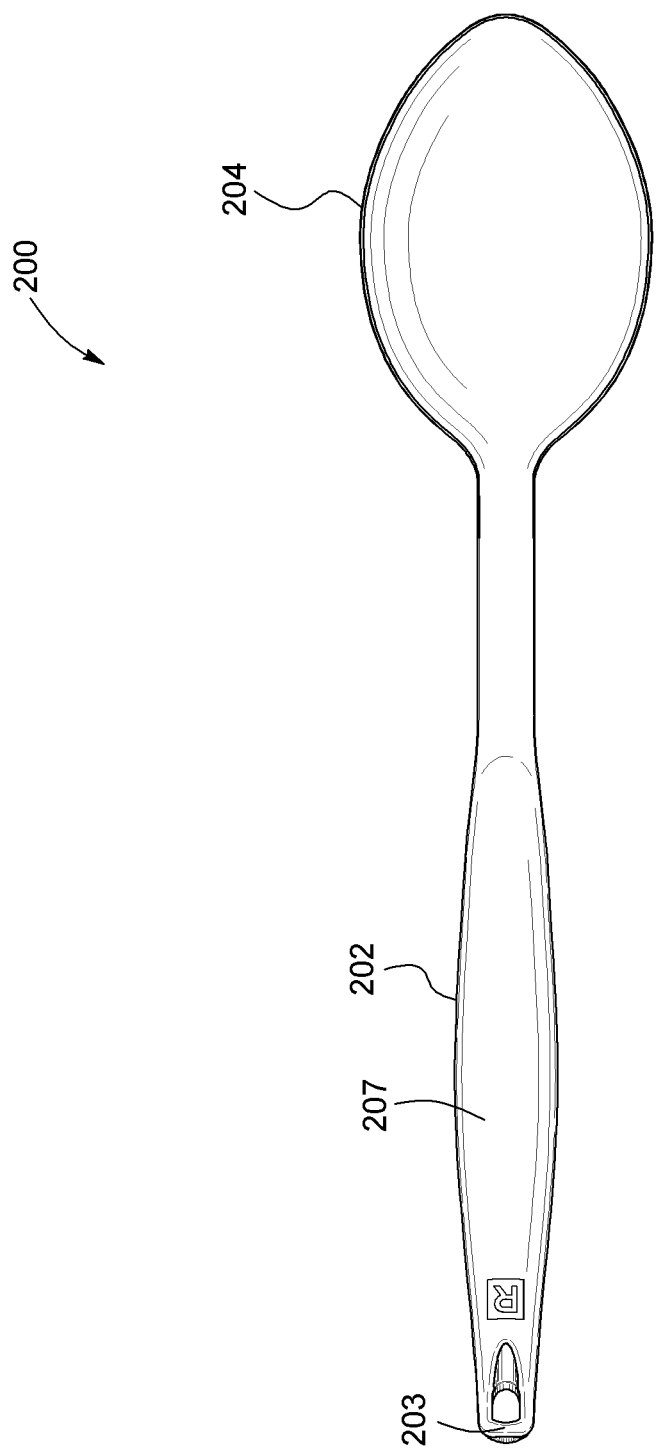
FIG. 13 is a top view of the utensil shown in FIG. 9.
Figure 14:
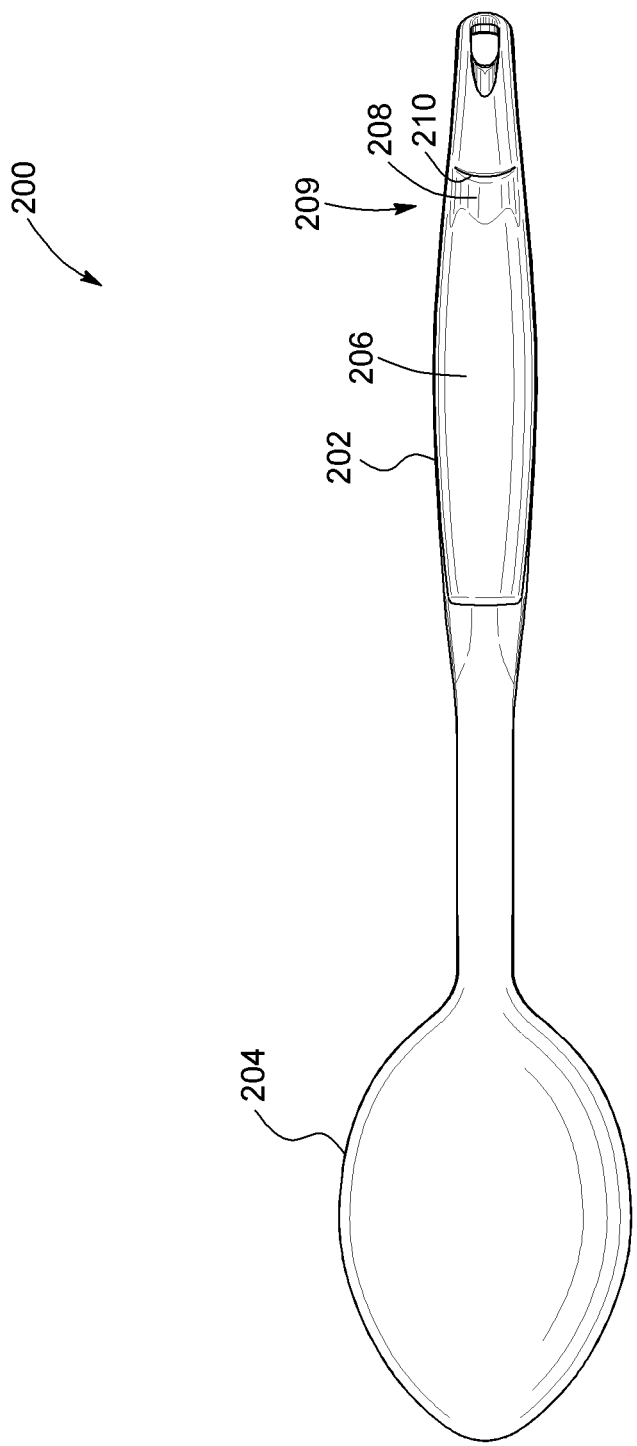
FIG. 14 is a bottom view of the utensil shown in FIG. 9.

With reference to FIG. 1 to 4, the cooking vessel 100 and utensil 200 form a cooking assembly 300. The utensil 200 will now be better described with further reference to FIG. 9 to 14. As previously mentioned, the stem 202 of the utensil 200 is shaped to cooperate with the predetermined shape of the opening 110 of the elongated handle 106 of the cooking vessel 100. More particularly, the stem 202 has a lower portion 206, which comprises a recessed portion 208 (better shown in FIGS. 9, 10 and 12), located in the above-mentioned contact portion 209, to mate with the lower peripheral portion 114 of the opening 110 of the elongated handle 106.

The lower peripheral portion 114 of the opening 110 comprises a stopper edge 122 and the recessed portion 208 of the utensil 200 comprises a locking edge 210 (better shown in FIGS. 9 and 10), that is shaped and positioned to match with the stopper edge 122 in order to hook the stem 202 against the lower peripheral portion 114 of the opening 110 of the handle 106 of the cooking vessel 100. Indeed, the locking edge 210 of the utensil 200 rests against the stopper edge 122 of the handle 106 of the cooking vessel 100. Preferably, the locking edge 210 of the utensil 200 and stopper edge 122 of the opening 110 have complementary curved profiles, in order to position the utensil with respect to the handle.

The above described stopper edge 122, curved lower peripheral portion 114 which extends along the handle 106 and recess 120 of the upper peripheral portion 112, as well as the recessed portion 208 of the utensil, further provide tactile references which allow a user to naturally position the stem of the handle in a stable supported position with respect to the opening 110, as well as to align the cooking implement 204 of the utensil 200 with respect to the container 102 of the cooking vessel 100.

Thus, the present invention is particularly useful in that it allows resting a utensil on a cooking vessel, without having to resort to another receptacle for resting the utensil or placing the utensil in the container of the vessel. Moreover, by resting the utensil on the cooking vessel, with the implement being suspended above the container, residual food matter which drips from the utensil falls into the container of the cooking vessel, in order to avoid soiling a surrounding surface. Furthermore, the positioning of the holding means (i.e. the opening) at the free end of the handle reduces the risk of burns or the like when placing or removing the utensil with respect to the cooking vessel, as the connection between the utensil and the cooking vessel is spaced away from the container of the cooking vessel.

Moreover, according to the illustrated embodiments, the present invention is achieved with subtle modifications to a standard cooking vessel and cooking utensil, and thus generally maintains the known designs of such cooking vessels and utensil. Indeed, they do not require additional components which may interfere with the normal usage or aesthetic of such cooking vessels and utensils. The skilled reader will understand that according to embodiments of the present invention, the cooking vessel may be shaped to accommodate a variety of standard utensils or the like. The embodiments illustrated herein are also easily adaptable to a wide variety of shapes of vessels and of utensils, as is readily apparent to the skilled person.

Moreover, the present invention is advantageous in that the above-described cooking vessel combines the opening normally used for hooking the cooking vessel with a holding means, and is thus simple in design and manufacture, as well as for operating. Indeed, the stem of the utensil may be easily introduced and secured into the opening of the handle, without the need to balance the stem into a stable position. Moreover, it is very easily adapted to a conventional cooking vessel design, as previously mentioned. Embodiments of the present invention are also advantageous in that the stem is inclined downwardly to prevent matter which is present on the implement of the utensil from dripping along the stem. Embodiments of the present invention are also advantageous in that the implement is positioned, when the utensil is held by the handle of the cooking vessel, so as to reduce interference with other cooking activities. Indeed, if the implement and/or stem points upwardly, it may be obstructive to movements of the user, etc.

Figure 15:
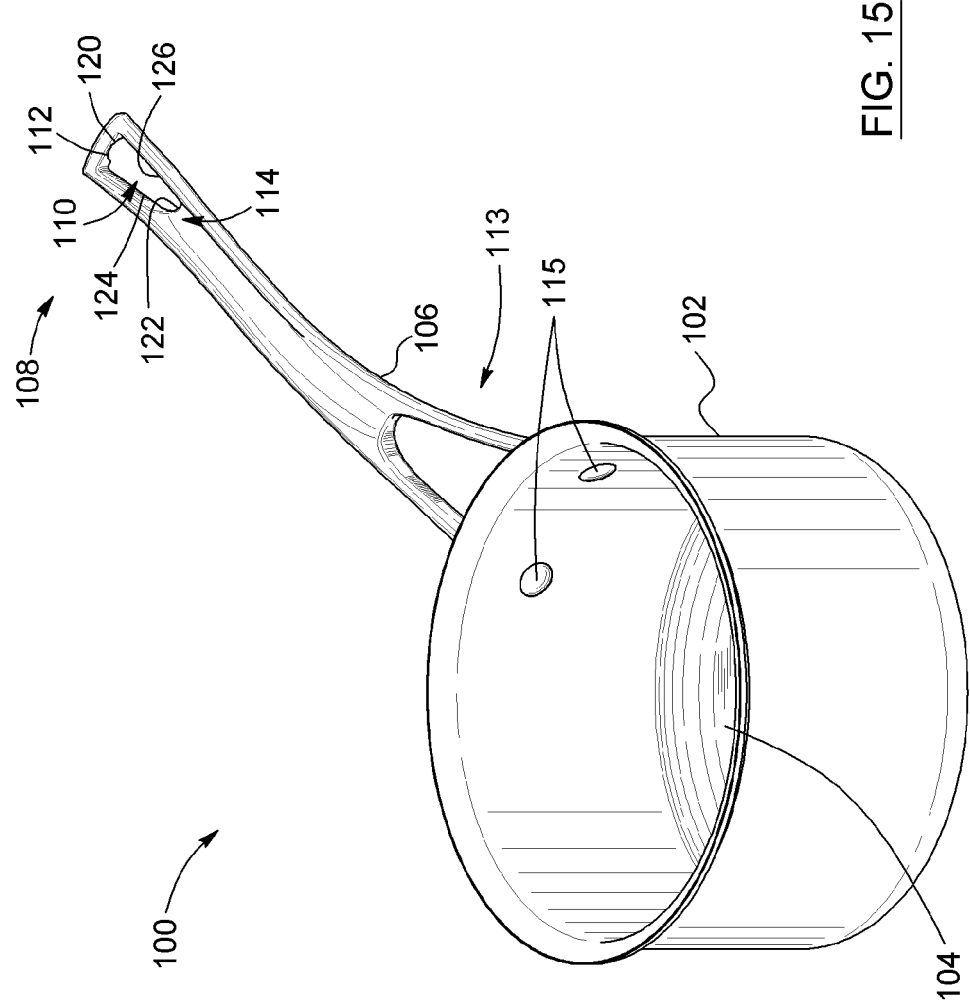
FIG. 15 is a perspective view of a cooking vessel according to another embodiment of the present invention.
Figure 16:
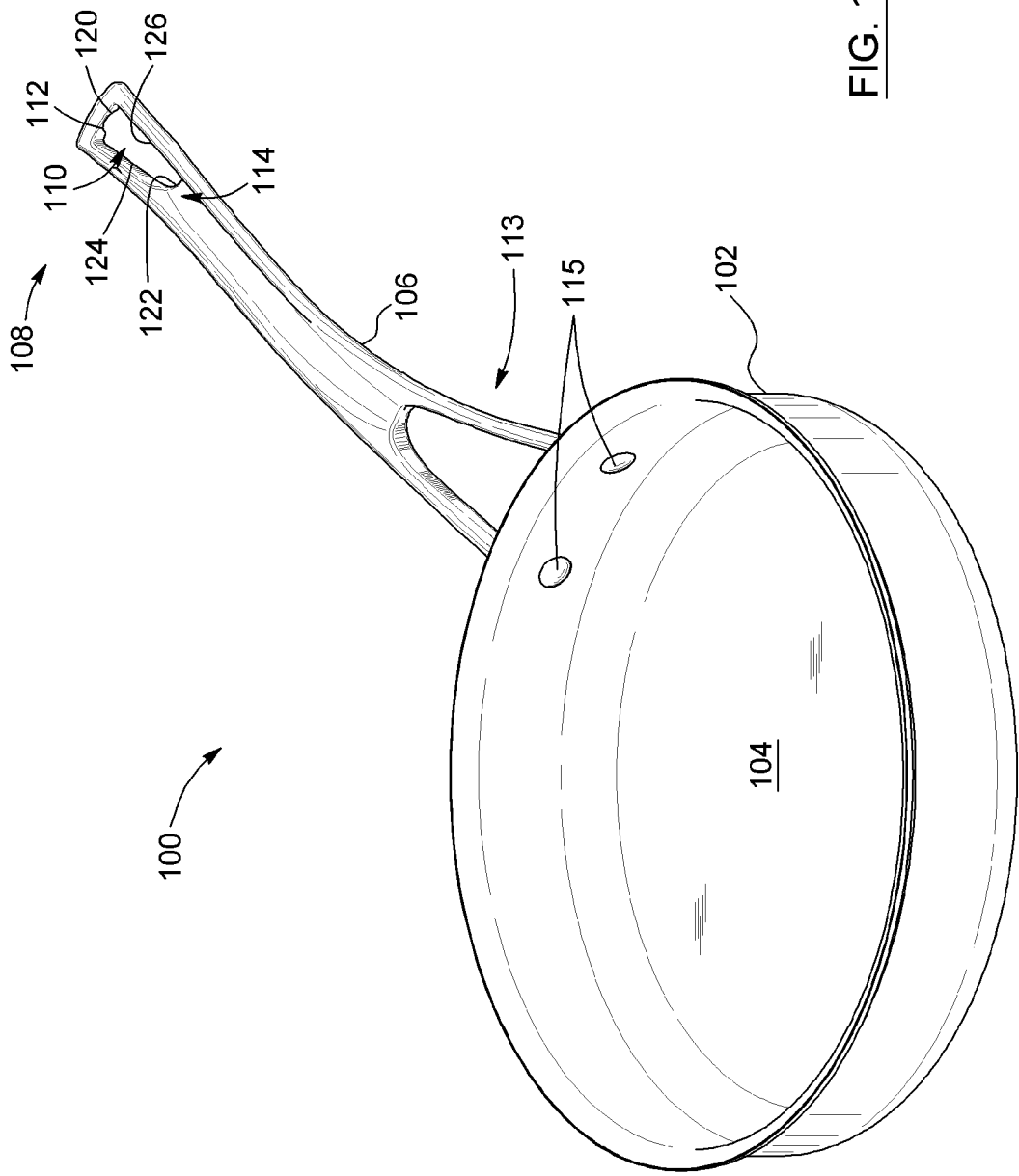
FIG. 16 is a perspective view of a cooking vessel according to another embodiment of the present invention.
Figure 17:
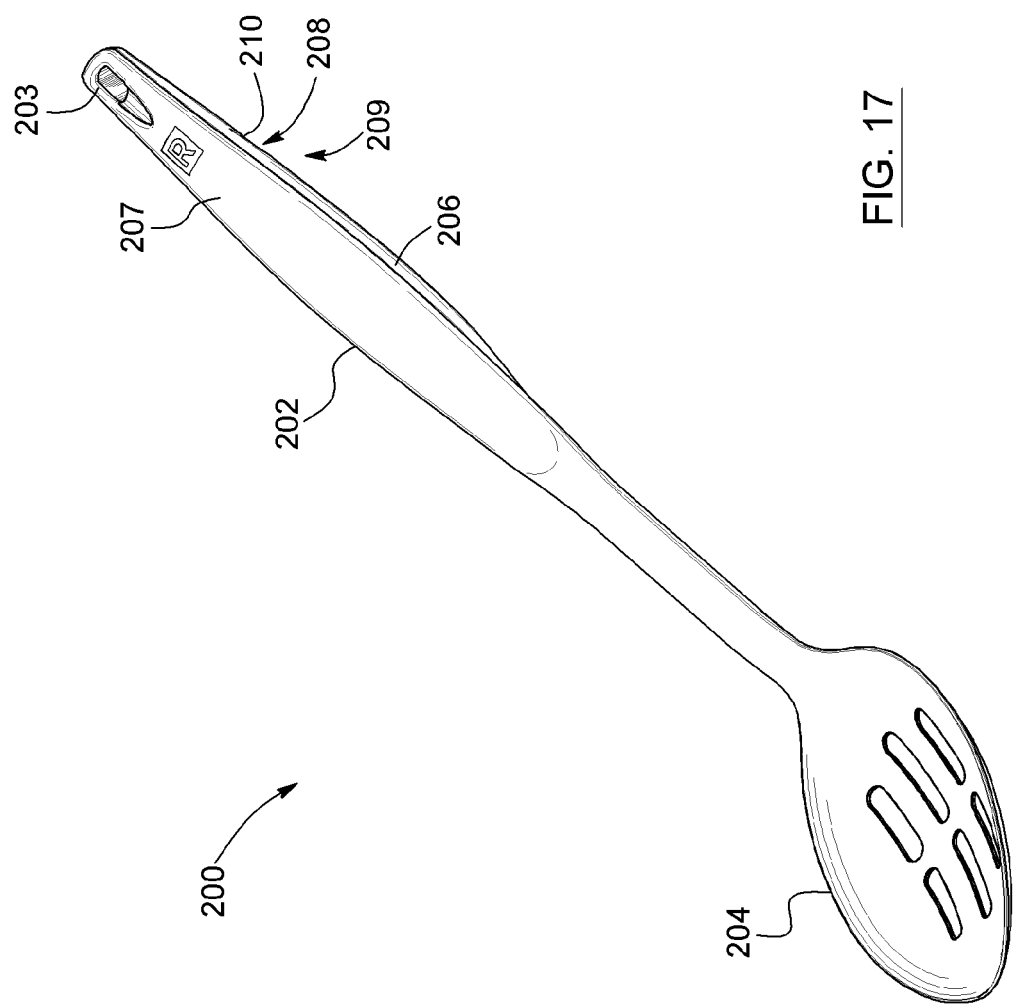
FIG. 17 is a perspective view of a utensil according to another embodiment of the present invention.
Figure 18:
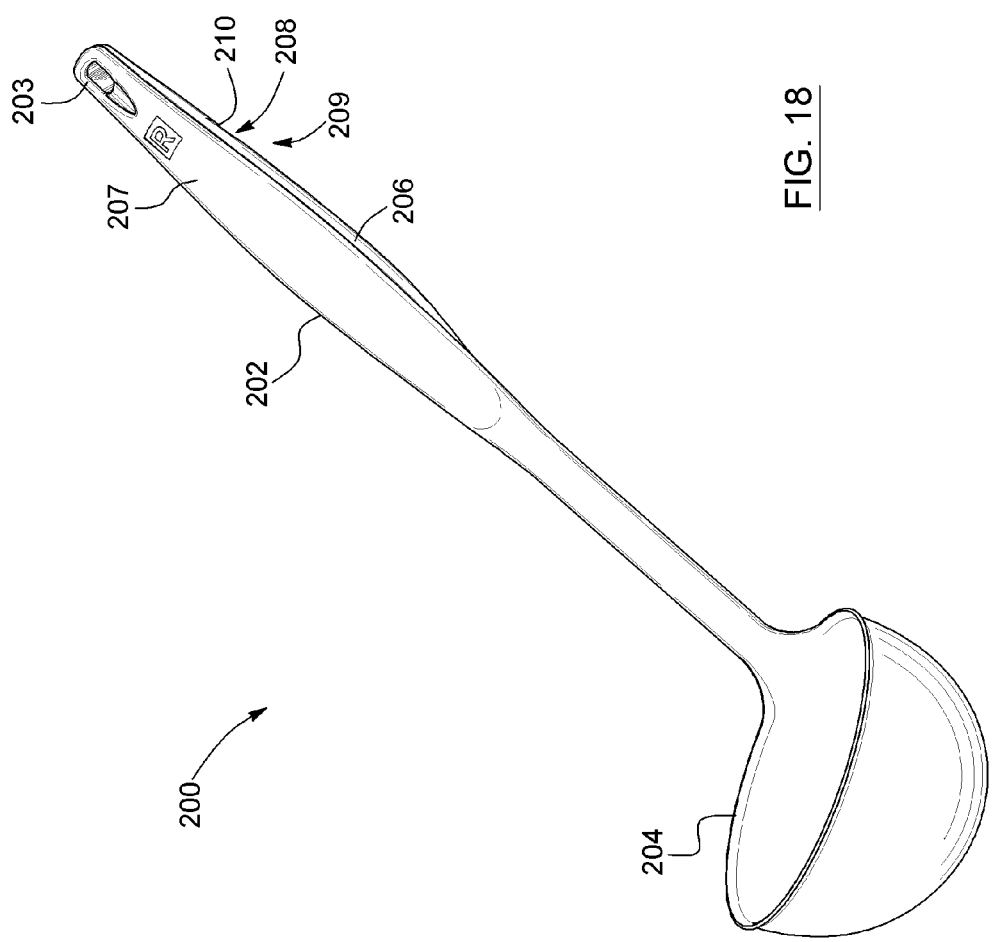
FIG. 18 is a perspective view of a utensil according to another embodiment of the present invention.
Figure 19:
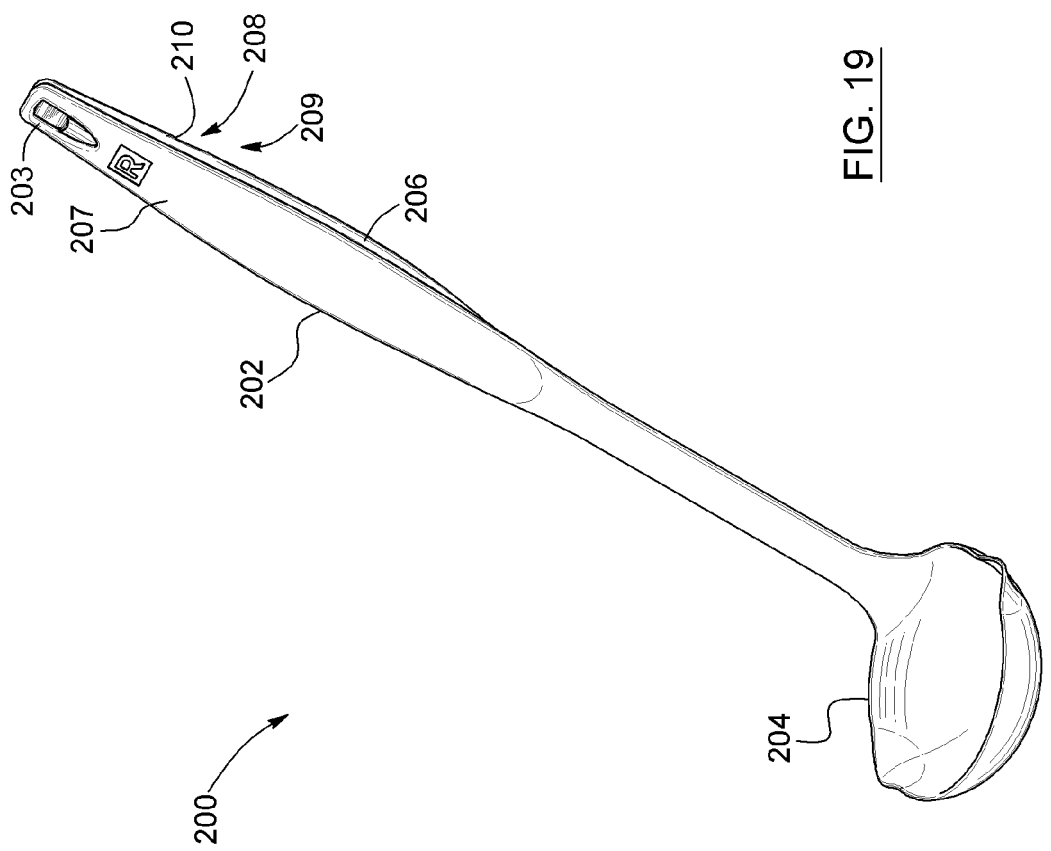
FIG. 19 is a perspective view of a utensil according to yet another embodiment of the present invention.
Figure 20:
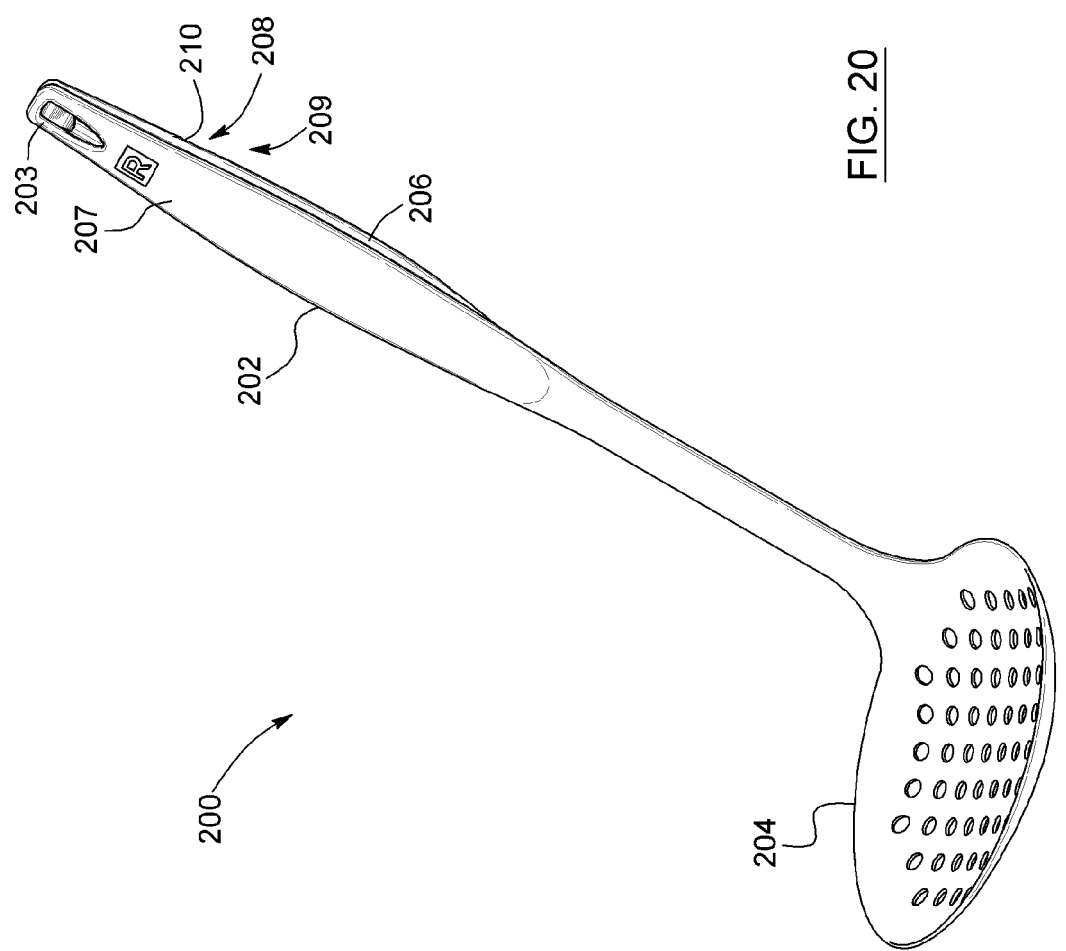
FIG. 20 is a perspective view of a utensil according to yet another embodiment of the present invention.
Figure 21:
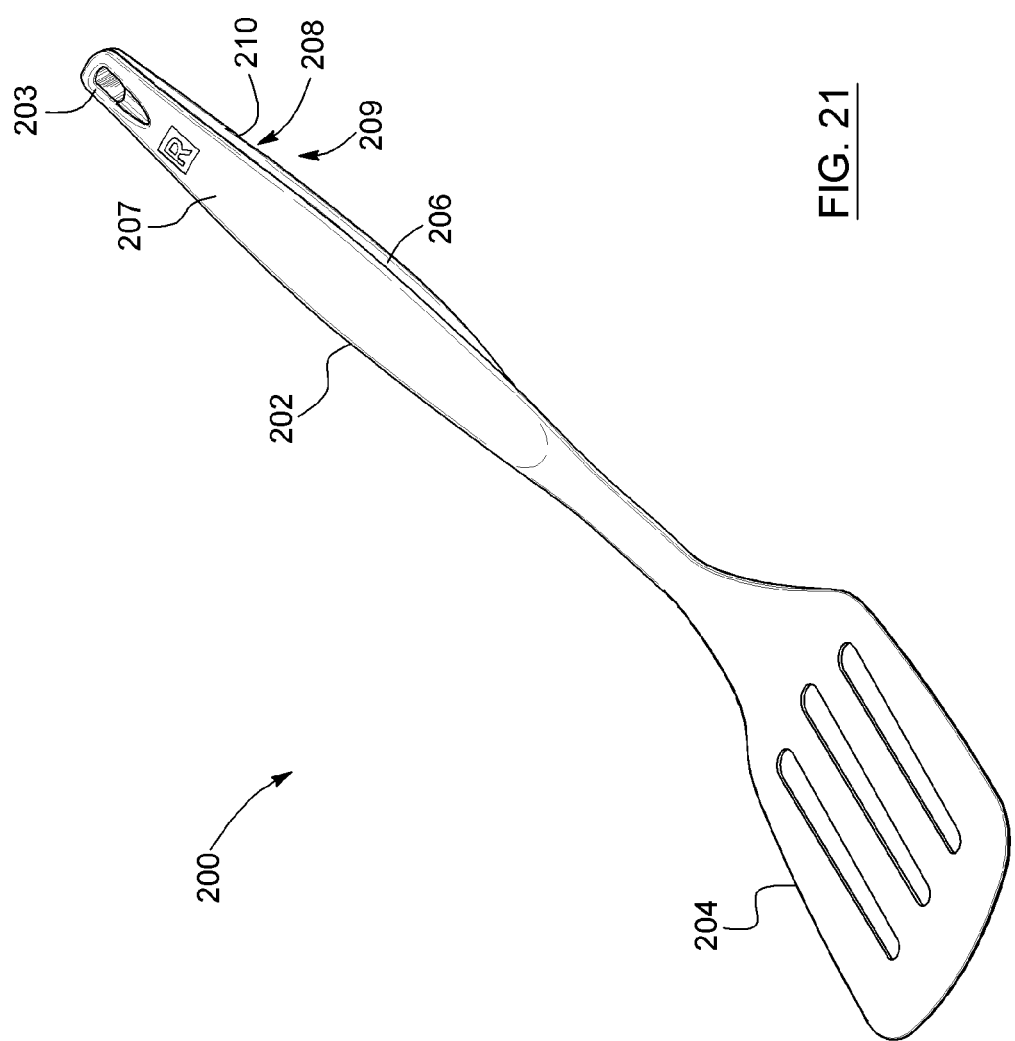
FIG. 21 is a perspective view of a utensil according to yet another embodiment of the present invention.
Figure 22:
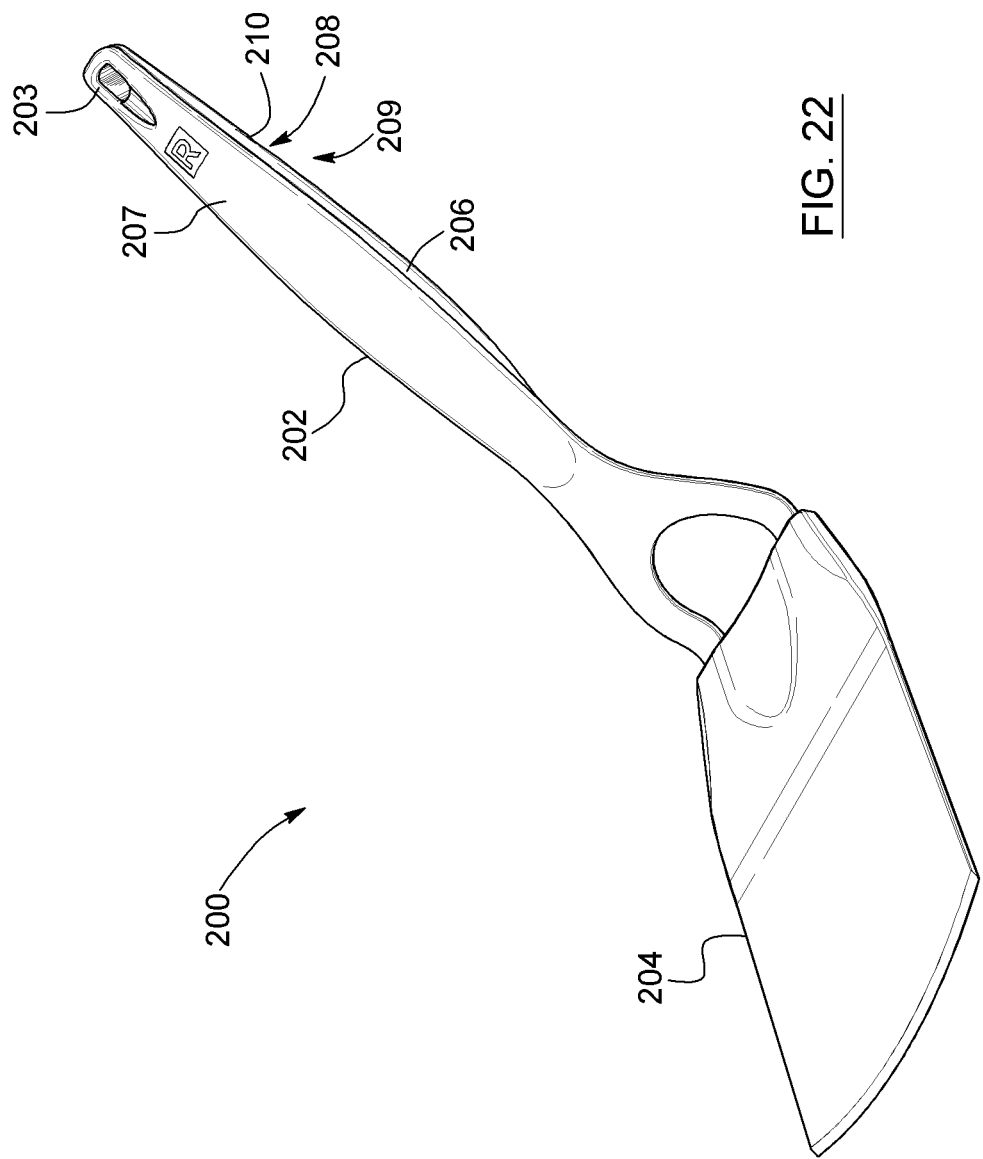
FIG. 22 is a perspective view of a utensil according to yet another embodiment of the present invention.
Figure 23:
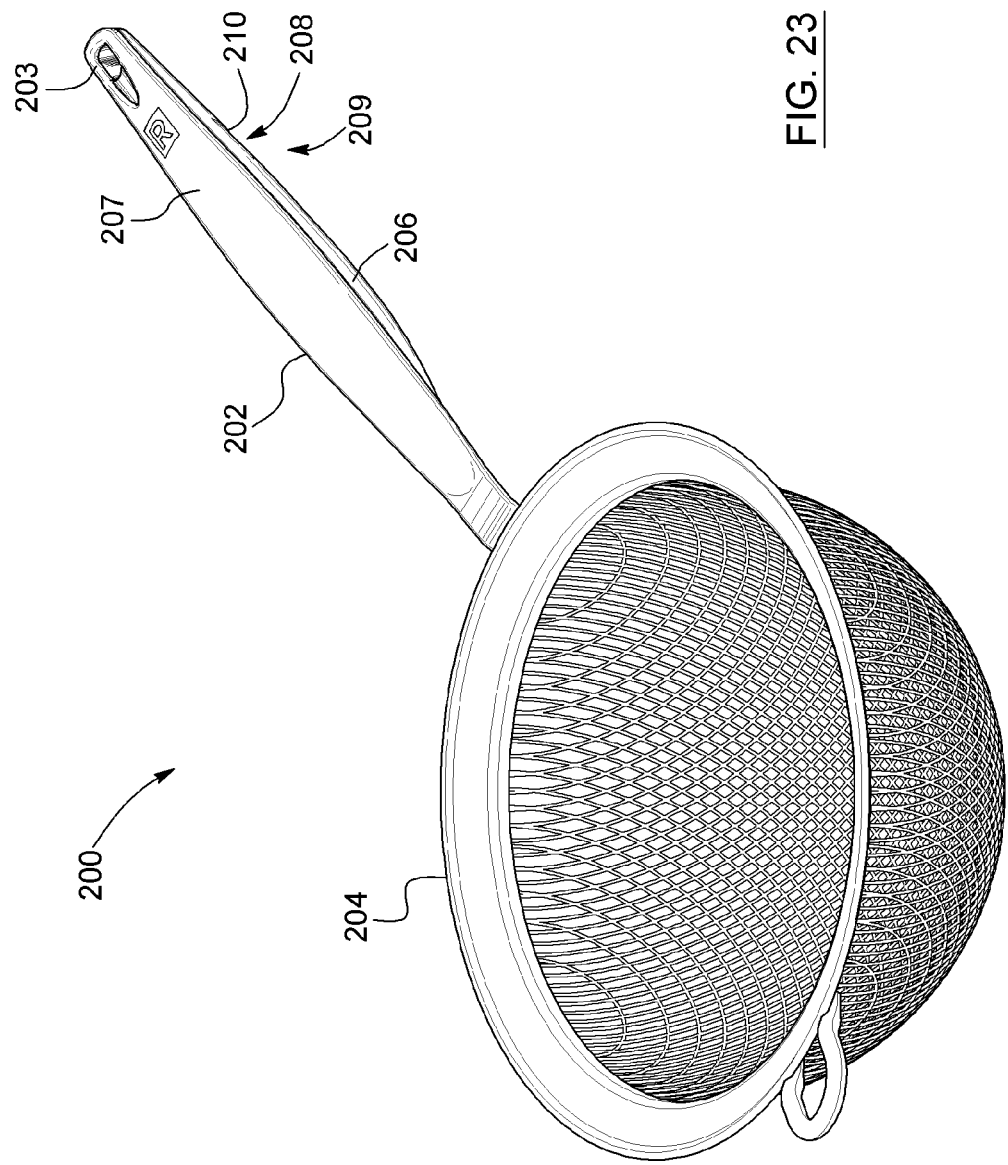
FIG. 23 is a perspective view of a utensil according to yet another embodiment of the present invention.

The above-mentioned cooking vessel and utensil may be provided in a variety of embodiments as previously mentioned. For example, the cooking vessel may have any suitable shape of container, as exemplified in FIGS. 15 and 16. Moreover, examples of different utensils 200 are illustrated in FIG. 17 to 23, according to embodiments of the present invention.

It is to be understood that depending on the particular configuration of the cooking vessel, as well as on the shape, length and size of the utensil, the cooking implement may hang above the container or inside the container of the cooking vessel (i.e. below an upper rim of the container), when the utensil is held by the opening on the handle of the cooking vessel.

Several modifications could be made to the above-described cooking vessel, handle, utensil or cooking assembly, without departing from the scope of the present invention, as can be easily understood by a person skilled in the art. Indeed and for example, the opening may be shaped to frictionally engage the stem of the utensil along the peripheral surface defining the opening or along one or more portion of the peripheral surface. The opening may be provided with a flexible biased material surrounding the opening, i.e. a cushion, wherein the stem of the utensil may be squeezed into and held in place. Moreover, the opening of the handle and/or stem of the utensil may comprise an anti-skid surface and/or the like, in order to enhance friction between the stem and the opening. Still according to an embodiment, the utensil may be secured to the handle of the cooking vessel only by means of the locking edge in conjunction with the stopper edge of the lower peripheral portion, or another similar hooking mechanism. As previously mentioned, the utensil may be provided with a recess on an upper portion of the stem, according to an alternative embodiment, to engage the upper peripheral portion of the opening. Still alternatively, the utensil may have a hook-shaped free end to be fitted through the opening and looped about the free end of the handle of the cooking vessel to be hooked thereto. Alternatively or additionally, the hook-shaped free end is configured to hook onto the lower peripheral portion of the opening.

In the context of the present description, the term lower peripheral portion generally refers to a surface provided near or along the opening, on a side of the opening which is proximal with respect to the container of the cooking vessel. Still in the context of the present description, the term upper peripheral portion generally refers to a surface provided near or along the opening, on a side of the opening which is distal with respect to the container of the cooking vessel. The lower or upper peripheral portions may be provided at any suitable angle. The upper peripheral portion may be substantially vertical, for example, to hold a corresponding surface of the stem by friction.

Also, it is to be understood that the opening, according to alternative embodiments, may be configured to place the stem or utensil horizontally or even to incline the stem or utensil upwardly. Still alternatively, the opening is configured to allow the utensil to be oriented according to different angles.

Moreover, the handle may be provided in any suitable shape, size, configuration and/or orientation. Moreover, even if the handle is not inclined downwardly, it may be provided with suitably located first and second contact surfaces to incline the utensil as desired, i.e. upward or downward. Also the first and/or second contact surface may be spaced away from the opening. Moreover, it is to be understood also that the stem does not necessary extend all the way through the opening to be held therein, according to some embodiments of the present invention.

Several other modifications could be made to the above-described cooking vessel, handle, utensil or cooking assembly, without departing from the scope of the present invention, as can be easily understood by a person skilled in the art. Indeed and for example, the opening may be configured to allow positioning the utensil according to different options. For example, the upper peripheral portion may be provided with a plurality of laterally offset recesses to allow positioning the stem along different angles with respect to the longitudinal axis of the handle. Still alternatively, the lower peripheral surface is provided with a recess or recesses for accommodating the profile of the stem.

It is to be understood also, that the utensil may be configured according to any suitable shape for cooperating with the opening of the cooking vessel to be temporarily held and to align the implement with an area corresponding to the container of the cooking vessel. According to alternative embodiments, the implement of the utensil is not aligned with the area corresponding to the container, which may be suitable when the implement does not have any matter thereon which is likely to drip and/or to allow full access to the container of the cooking vessel. According to alternative embodiments, the utensil is configured to be held by the opening at different points along the stem. For example, the stem may be provided with a series of recessed portions along the stem with corresponding locking edges, such as the one described above, which are each compatible with the opening of the handle of the cooking vessel, to allow a user to position the utensil at various lengths, positions, etc., for example, in order to be compatible with different sizes of cooking vessels, etc. Still alternatively and as previously mentioned, a recessed portion is provided on an upper portion of the stem to cooperate with the upper peripheral portion of the opening. Still alternatively, the stem is configured to be positioned at a particular angle with respect to the handle, for example with one or more recesses or protrusions which are positioned to cooperate with the upper and lower peripheral portions of the opening of the handle. Thus the angle of the stem when held by the handle of the cooking vessel may vary depending on the particular utensil.

According to an alternative embodiment, the handle of the cooking vessel and the stem of the corresponding utensil to be supported on the cooking vessel may have an identical or very similar shape in order to reduce manufacture costs and effort.

Numerous other modifications could be made to the above-described cooking vessel, handle, utensil and cooking assembly, without departing from the scope of the present invention. The above-described embodiments are considered in all respect only as illustrative and not restrictive, and the present application is intended to cover any adaptations or variations thereof, as apparent to a person skilled in the art.

Moreover, although the present invention provides a cooking vessel for cooking food, embodiments of the present invention may also be adapted for a baking dish, a plate and/or the like, as can also be easily understood by a person skilled in the art, without departing from the scope of the present invention. Moreover, the present invention may also be adapted for other receptacles which are used with a tool for dispensing the content of the recipient, such as for example a can of paint with a paintbrush, etc.

The above-described embodiments are considered in all respect only as illustrative and not restrictive, and the present application is intended to cover any adaptations or variations thereof, as apparent to a person skilled in the art. Of course, numerous other modifications could be made to the above-described embodiments without departing from the scope of the invention, as apparent to a person skilled in the art.

The invention claimed is:

1. A cooking vessel to be used with a utensil having a cooking implement and a stem extending from the cooking implement, the stem having a lower portion comprising a recessed portion, the recessed portion comprising a locking edge, the locking edge having a curved profile, the cooking vessel comprising:
   a container having a bottom surface; and
   an elongated handle extending outwardly from the container, the handle having a free end provided with an opening for hooking the cooking vessel, the opening being sized and shaped for receiving the stem of the utensil, the opening having a predetermined shape for cooperating with the stem to temporarily hold the stem so that the cooking implement hangs above the bottom surface of the container, the predetermined shape of the opening being characterized by an upper peripheral portion and a lower peripheral portion located between the upper peripheral portion and the container, the upper and lower peripheral portions of the opening cooperating with the stem to temporarily hold said stem between said upper and lower peripheral portions, the upper peripheral portion having an upper peripheral edge for resting the stem thereagainst, the lower peripheral portion comprising a stopper edge that is shaped to match with the locking edge of the recessed portion of the utensil in order to hook the stem of the utensil against the lower peripheral portion of the opening of the handle, so as to hold the stem between the upper peripheral edge and the stopper edge only, the stopper edge of the opening having a curved profile which is complementary to the curved profile of the locking edge of the utensil, in order to position the utensil with respect to the handle of the cooking vessel.

2. A cooking vessel according to claim 1, wherein the elongated handle extends upwardly.

3. A cooking vessel according to claim 2, wherein the upper peripheral portion is positioned with respect to the lower peripheral portion so that, when said utensil is temporarily held, the implement of said utensil is biased downwardly toward said bottom surface.

4. A cooking vessel according to claim 3, wherein the upper peripheral portion and the lower peripheral portion form an inclination angle with the plane of the bottom surface, wherein the inclination angle is between 15 and 60 degrees.

5. A cooking vessel according to claim 1, wherein the upper peripheral portion comprises a recess capable of cooperating with the stem.

6. A cooking vessel according to claim 5, wherein the recess is curved for mating with the stem of the utensil.

7. A cooking vessel according to claim 1, wherein the lower peripheral portion extends along the elongated handle of the cooking vessel, for supporting a corresponding contact portion of the stem of the utensil.

8. A cooking vessel according to claim 1, wherein the lower peripheral portion is curved for mating with the stem.

9. A cooking assembly comprising the cooking vessel according to claim 1 in combination with said utensil.

10. An elongated handle for a cooking vessel comprising a bottom surface, to be used with a utensil having a cooking implement and a stem extending from the cooking implement, the stem having a lower portion comprising a recessed portion, the recessed portion comprising a locking edge, the locking edge having a curved profile, the elongated handle comprising:
 a base having a mounting component for mounting the handle on the cooking vessel to extend outwardly therefrom; and
 a free end provided with an opening for hooking the cooking vessel, the opening being sized and shaped for receiving the stem of the utensil, the opening having a predetermined shape for cooperating with the stem to temporarily hold the stem so that the cooking implement hangs above the bottom surface of the container when the elongated handle is mounted on the cooking vessel, the predetermined shape of the opening being characterized by an upper peripheral portion and a lower peripheral portion located between the upper peripheral portion and the container, the upper and lower peripheral portions of the opening cooperating with the stem to temporarily hold said stem between said upper and lower peripheral portions, the upper peripheral portion having an upper peripheral edge for resting the stem thereagainst, the lower peripheral portion comprising a stopper edge that is shaped and positioned to match with the locking edge of the recessed portion of the utensil in order to hook the stem of the utensil against the lower peripheral portion of the opening of the handle, so as to hold the stem between the upper peripheral edge and the stopper edge only, the stopper edge of the opening having a curved profile which is complementary to the curved profile of the locking edge of the utensil, in order to position the utensil with respect to the handle of the cooking vessel.

11. A cooking vessel to be used with a utensil having a cooking implement and a stem extending from the cooking implement, the stem having a recessed portion comprising a locking edge, the cooking vessel comprising:
 a container having a bottom surface; and
 a handle extending from the container, the handle having a support surface for supporting the stem and an opening for receiving the stem of the utensil, the opening being characterized by an upper peripheral portion and a lower peripheral portion located between the upper peripheral portion and the container, the upper and lower peripheral portions of the opening cooperating with the stem to temporarily hold said stem between said upper and lower peripheral portions, the upper peripheral portion having an upper peripheral edge for resting the stem thereagainst, the opening having a stopper edge that is provided on the lower peripheral portion and that is shaped to match with said locking edge of the stem for hooking the stem against the opening to temporarily hold the utensil between the upper peripheral edge and the stopper edge only so that the cooking implement hangs above the bottom surface of the container.

12. A cooking vessel according to claim 11, wherein the handle is elongated and extends upwardly.

13. A cooking vessel according to claim 12, wherein the upper peripheral portion is positioned with respect to the lower peripheral portion so that, when said utensil is temporarily held, the implement of said utensil is biased downwardly toward said bottom surface.

14. A cooking vessel according to claim 13, wherein the upper peripheral portion and the lower peripheral portion form an inclination angle with the plane of the bottom surface, wherein the inclination angle is between 15 and 60 degrees.

15. A cooking vessel according to claim 11, wherein the upper peripheral portion comprises a recess capable of cooperating with the stem.

16. A cooking vessel according to claim 15, wherein the recess is curved for mating with the stem of the utensil.

17. A cooking vessel according to claim 11, wherein the support surface of the handle is curved for mating with the stem.

18. A cooking assembly comprising the cooking vessel according to claim 11 in combination with said utensil.

19. A handle for a cooking vessel comprising a bottom surface, to be used with a utensil having a cooking implement and a stem extending from the cooking implement, the stem having a recessed portion comprising a locking edge, the handle comprising:
 a base having a mounting component for mounting the handle on the cooking vessel;
 a support surface for supporting the stem; and
 an opening for receiving the stem of the utensil, the opening being characterized by an upper peripheral portion and a lower peripheral portion located between the upper peripheral portion and the container, the upper and lower peripheral portions of the opening cooperating with the stem to temporarily hold said stem between said upper and lower peripheral portions, the upper peripheral portion having an upper peripheral edge for resting the stem thereagainst, the opening having a stopper edge that is provided on the lower peripheral portion and that is shaped to match with said locking edge of the stem for hooking the stem against the opening to temporarily hold the utensil between the upper peripheral edge and the stopper edge only, so that the cooking implement hangs above the bottom surface of the container when the handle is mounted on the cooking vessel.

20. A utensil to be used with a cooking vessel comprising a container having a bottom surface and a handle extending from the container, the handle having an opening characterized by an upper peripheral portion and a lower peripheral portion located between the upper peripheral portion and the container, the opening comprising a stopper edge provided on the lower peripheral portion and an upper peripheral edge provided on the upper peripheral portion, the stopper edge of the opening having a curved profile, the utensil comprising:
 a cooking implement; and
 a stem extending from the cooking implement, the stem being shaped and sized to fit into the opening of the handle of the cooking vessel, the stem cooperating with the upper and lower peripheral portions of the opening and having a recessed portion comprising a locking edge that is shaped and positioned to match said stopper edge of the opening for positioning the stem with respect to the handle to temporarily hold the utensil between the upper peripheral edge and the stopper edge of the opening only so that the cooking implement hangs above the bottom surface of the container, the locking edge having a curved profile which is complementary to the curved profile of the stopper edge of handle of the cooking vessel, in order to position the utensil with respect to the handle of the cooking vessel.

* * * * *